United States Patent
Ohhira

(10) Patent No.: US 7,720,097 B2
(45) Date of Patent: May 18, 2010

(54) COMMUNICATION APPARATUS, COMMUNICATION METHOD, COMMUNICATION PROGRAM AND RECORDING MEDIUM

(75) Inventor: Kohki Ohhira, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1115 days.

(21) Appl. No.: 11/311,236

(22) Filed: Dec. 20, 2005

(65) Prior Publication Data

US 2006/0190717 A1    Aug. 24, 2006

(30) Foreign Application Priority Data

Dec. 21, 2004  (JP)  ............... 2004-369794
Dec. 16, 2005  (JP)  ............... 2005-362675

(51) Int. Cl.
*H04J 3/22* (2006.01)
*H04L 12/28* (2006.01)
*H04L 12/56* (2006.01)
*H04L 29/06* (2006.01)

(52) U.S. Cl. ............... 370/466; 370/401; 709/230; 713/153

(58) Field of Classification Search ............... 370/252, 370/401, 466; 713/153; 709/223, 224; 715/734
See application file for complete search history.

(56) References Cited

U.S. PATENT DOCUMENTS

| 6,282,388 | B1 | 8/2001 | Obata | |
| 6,694,437 | B1* | 2/2004 | Pao et al. | 726/15 |
| 7,065,102 | B1* | 6/2006 | Petersen et al. | 370/469 |
| 7,120,701 | B2* | 10/2006 | Warrier et al. | 709/245 |
| 7,181,613 | B2* | 2/2007 | Boebert et al. | 713/153 |
| 7,496,097 | B2* | 2/2009 | Rao et al. | 370/392 |
| 2002/0024959 | A1* | 2/2002 | Kong | 370/401 |
| 2002/0075844 | A1* | 6/2002 | Hagen | 370/351 |
| 2002/0091921 | A1 | 7/2002 | Kunzinger | |
| 2003/0072023 | A1 | 4/2003 | Tanaka | |
| 2003/0126429 | A1* | 7/2003 | Jinmei et al. | 713/153 |
| 2004/0030627 | A1 | 2/2004 | Sedukhin | |
| 2004/0044910 | A1* | 3/2004 | Ylipieti | 713/201 |
| 2004/0083295 | A1 | 4/2004 | Amara et al. | |

(Continued)

FOREIGN PATENT DOCUMENTS

EP    0 052 713 A2    6/1982

(Continued)

OTHER PUBLICATIONS

U.S. Appl. No. 11/752,468, filed May 23, 2007, Ohhira.

(Continued)

*Primary Examiner*—Chi H Pham
*Assistant Examiner*—Warner Wong
(74) *Attorney, Agent, or Firm*—Oblon, Spivak, McClelland, Maier & Neustadt, L.L.P.

(57) ABSTRACT

A communication apparatus that is connected to an information processing apparatus is provided. The communication apparatus includes: an information processing apparatus discovery unit configured to discover the information processing apparatus; a secure communication packet conversion unit configured to convert a non-secure communication packet transmitted by the discovered information processing apparatus into a secure communication packet; and a non-secure communication packet conversion unit configured to convert the secure communication packet destined for the information processing apparatus into the non-secure communication packet.

14 Claims, 31 Drawing Sheets

U.S. PATENT DOCUMENTS

| | | |
|---|---|---|
| 2004/0109186 A1 | 6/2004 | Shindoh et al. |
| 2004/0120328 A1* | 6/2004 | Adrangi et al. ............ 370/401 |
| 2005/0068981 A1* | 3/2005 | Park et al. .................. 370/466 |
| 2006/0256815 A1* | 11/2006 | Kivinen et al. ............. 370/466 |

FOREIGN PATENT DOCUMENTS

| | | |
|---|---|---|
| JP | 2002-251071 | 9/2002 |
| JP | 2002-317148 | 10/2002 |
| JP | 2003-78813 | 3/2003 |
| JP | 2004-86590 | 3/2004 |

OTHER PUBLICATIONS

J. Veizades, et al., "Service Location Protocol", Network Working Group, http://www.sanface.com/txt2pdf.html, XP-015007949, Jun. 1997, 73 pages.

U.S. Appl. No. 11/853,377, filed Sep. 11, 2007, Ohhira.

* cited by examiner

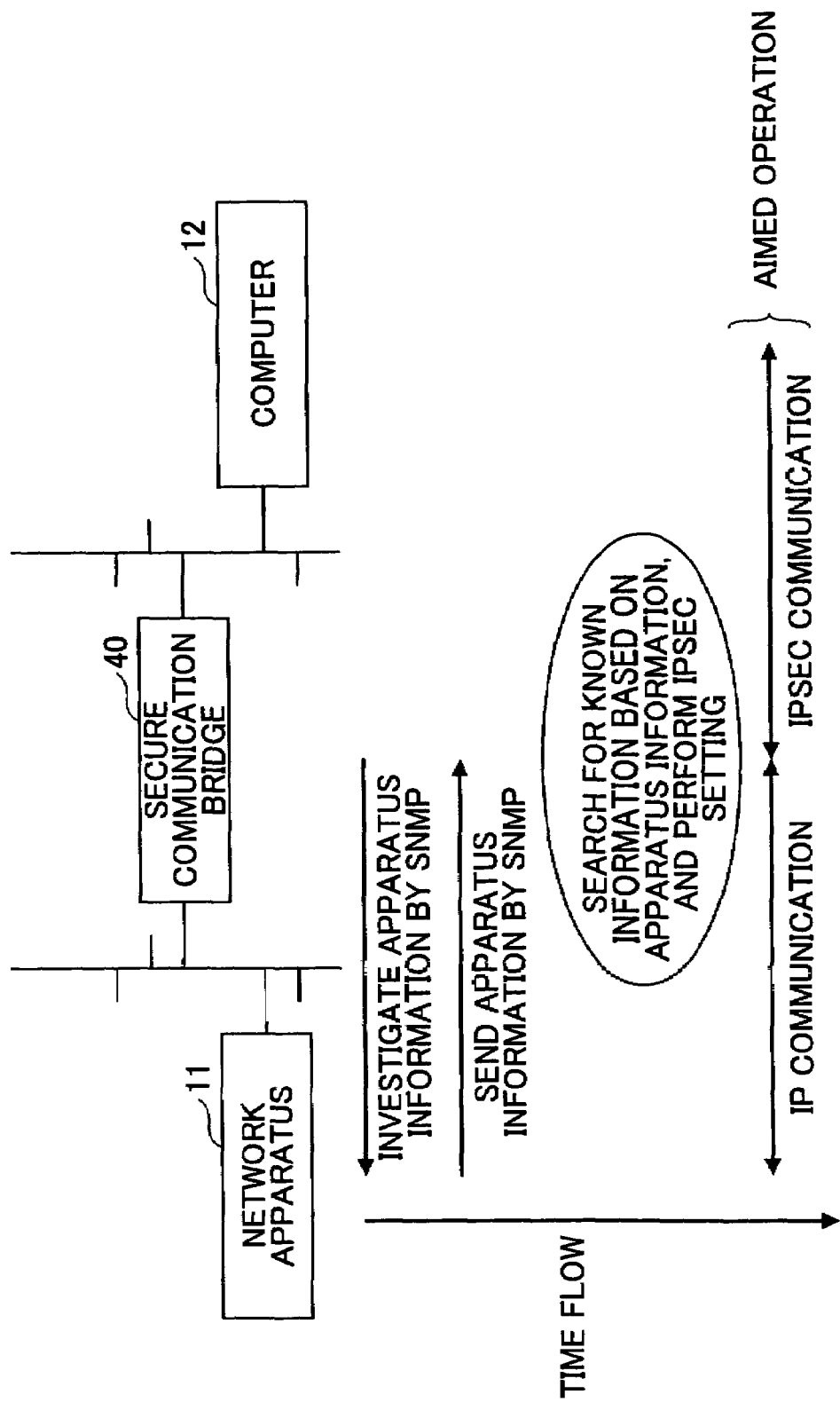

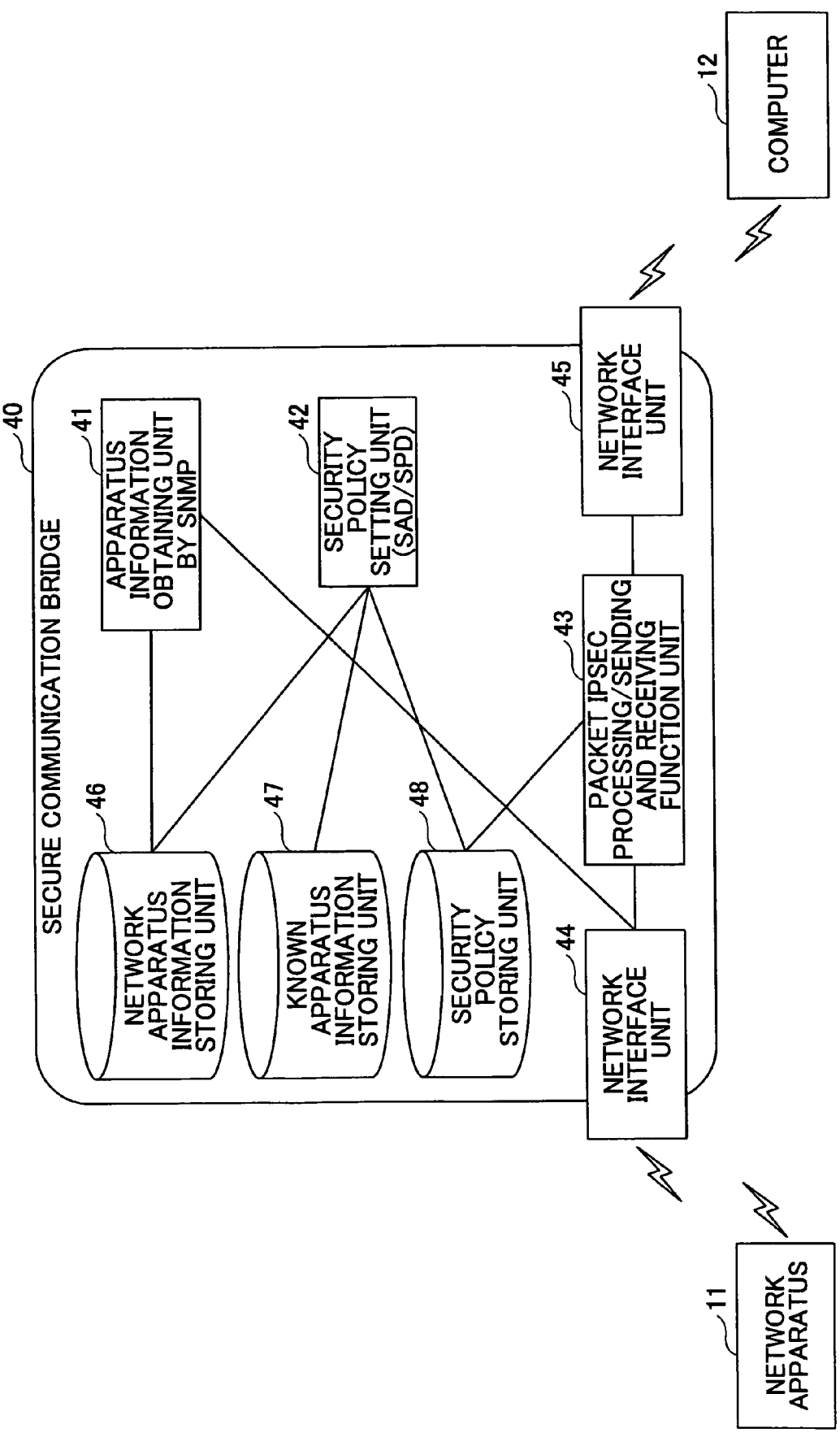

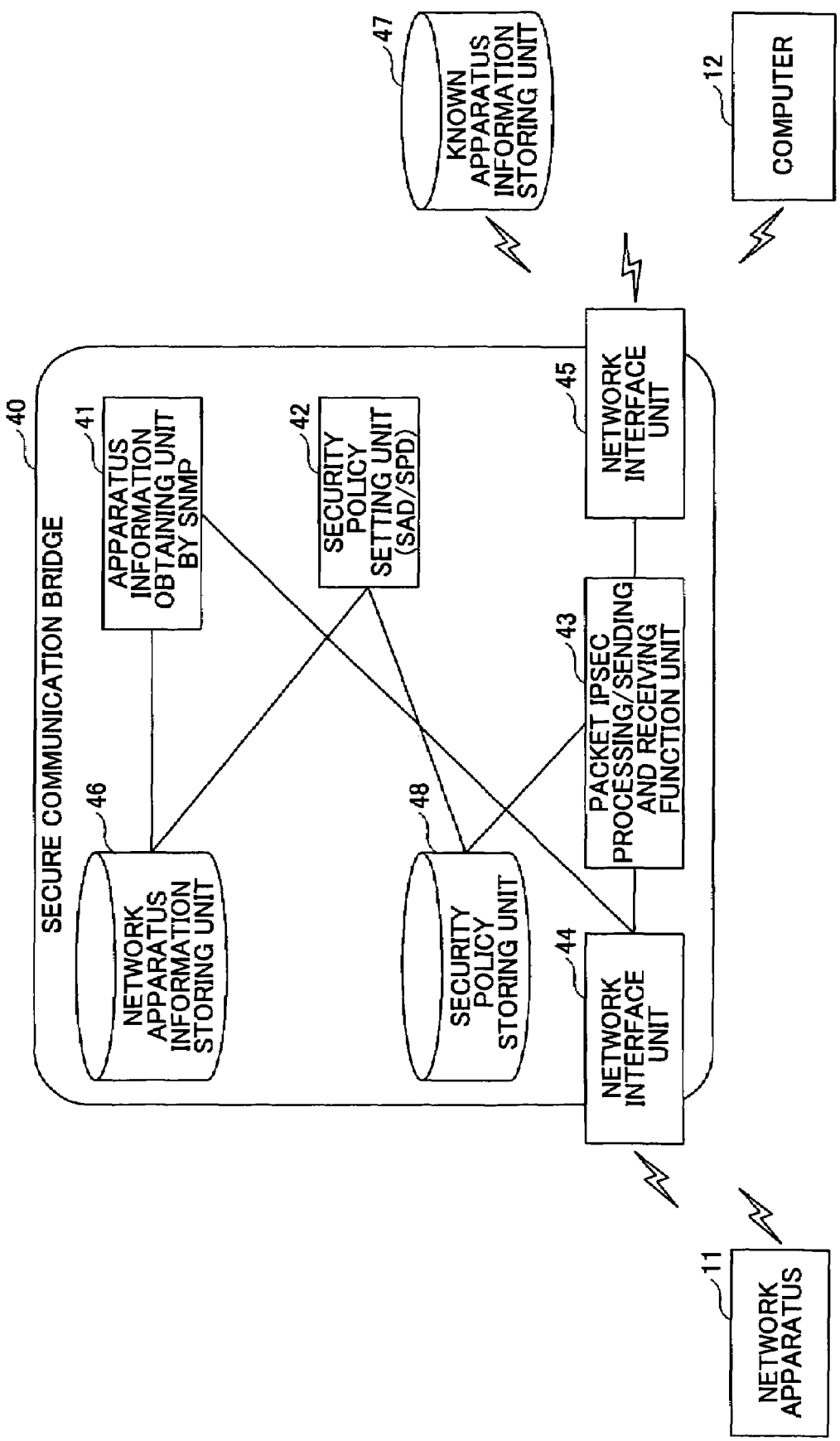

FIG.7

| NETWORK APPARATUS INFORMATION | INFORMATION FOR SPECIFYING MODEL (PRODUCT NAME, ETC.) | ABC100 | ... |
|---|---|---|---|
| | IPv4 ADDRESS OF APPARATUS | xxx.xxx.xxx.xxx | |
| | IPv6 ADDRESS OF APPARATUS | yyyy:yyyy::yyyy:yyyy zzzz:zzzz::zzzz:zzzz | |

FIG.8

| KNOWN APPARATUS INFORMATION | INFORMATION FOR SPECIFYING MODEL (PRODUCT NAME, ETC.) | ABC100 | ABC101 |
|---|---|---|---|
| | NECESSITY OF IPSEC ACCELERATION | NECESSARY | UNNECESSARY |

FIG.9

| IP ADDRESS OF APPARATUS TO BE ACCELERATED | xxx.xxx.xxx.xxx | yyyy:yyyy::yyyy:yyyy | zzzz:zzzz::zzzz:zzzz |
|---|---|---|---|
| SECURITY POLICY (SAD/SPD) FOR EACH IP ADDRESS — DESTINATION IP ADDRESS | ALL | ALL | ALL |
| KEY SETTING METHOD | IKE | IKE | IKE |
| ENCAPSULATION MODE | ESP | ESP | ESP |
| ENCRYPTION METHOD | 3DES | 3DES | 3DES |

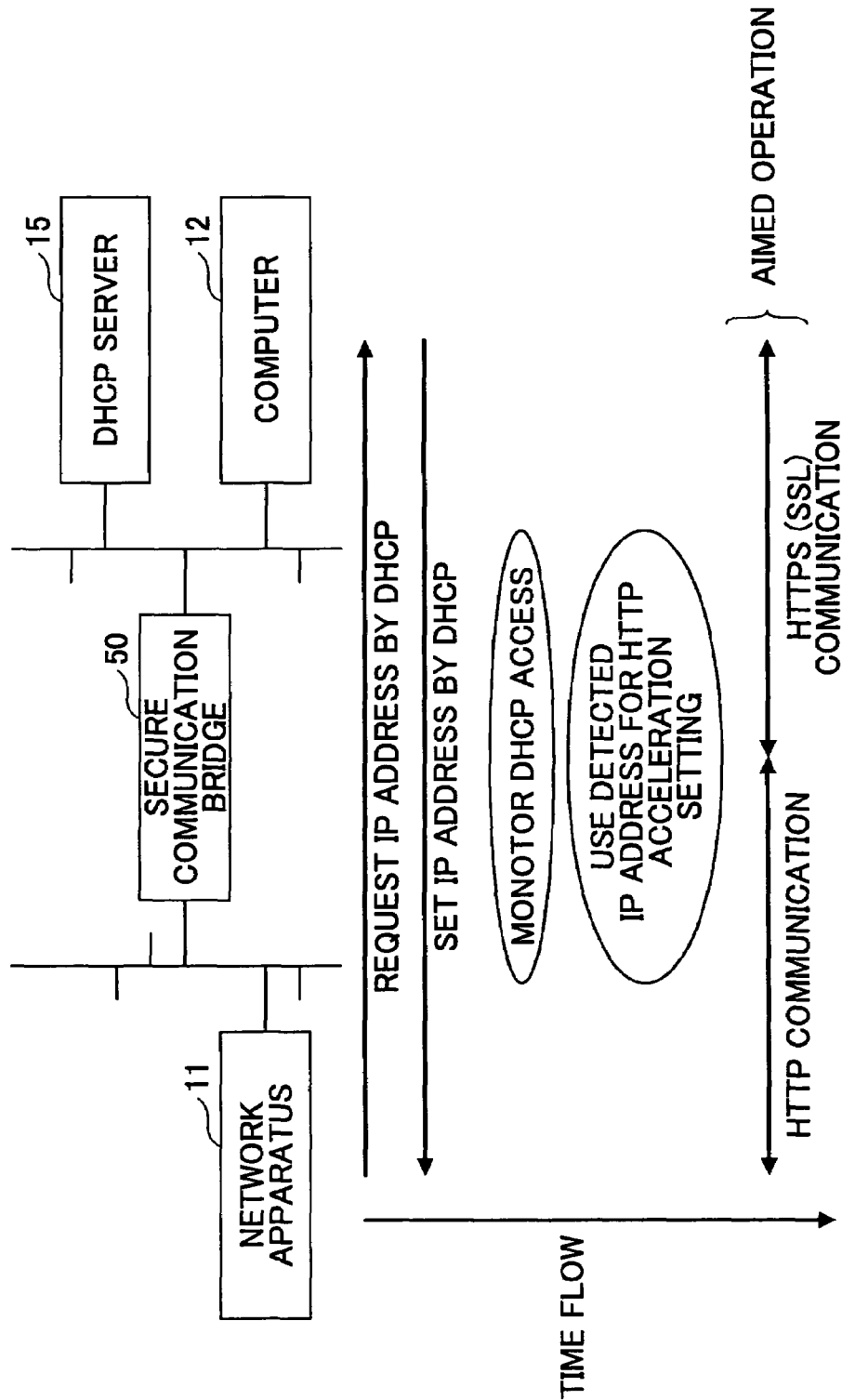

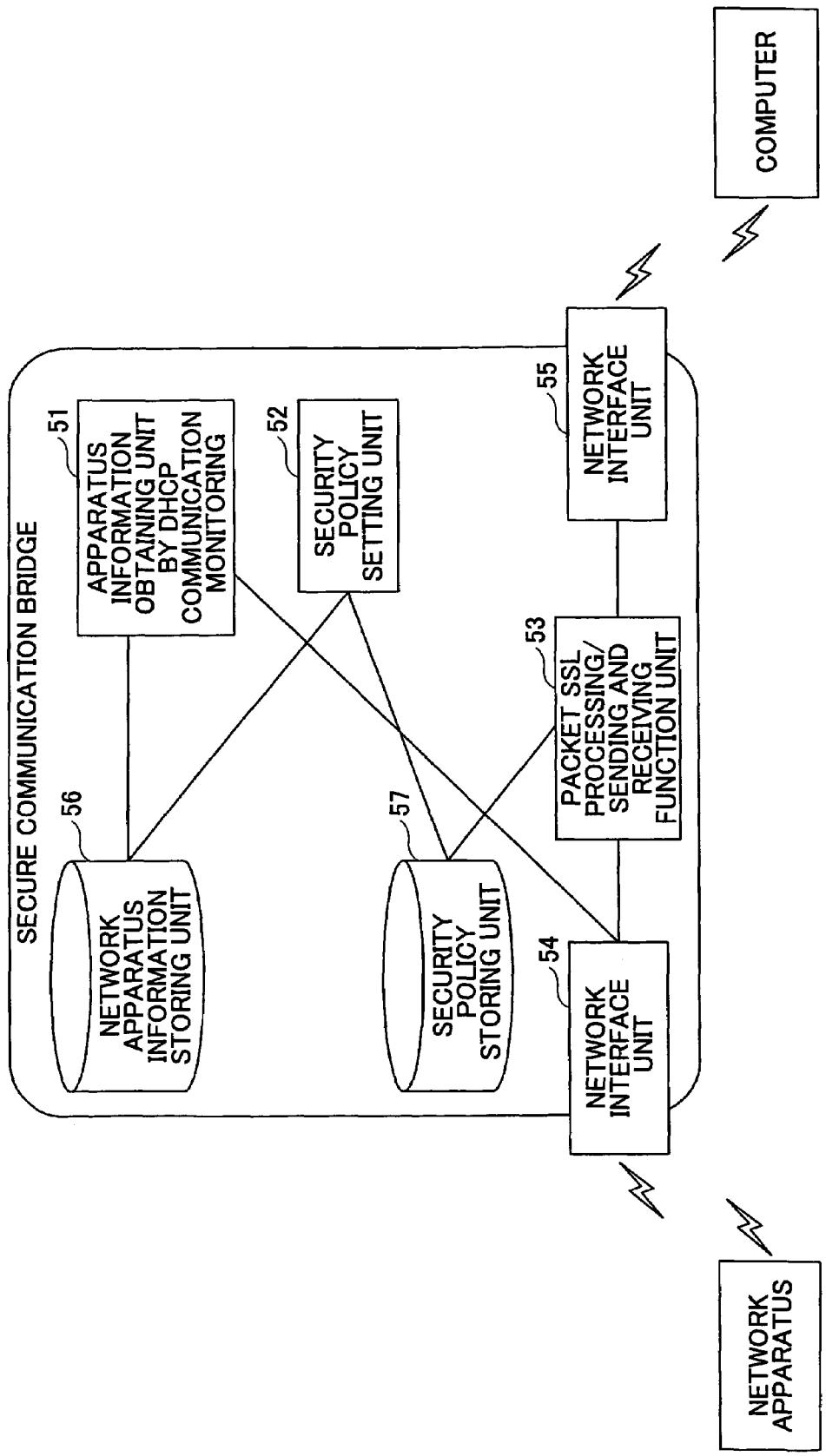

FIG.14

| NETWORK APPARATUS INFORMATION | IPv4 ADDRESS OF APPARATUS | xxx.xxx.xxx.xxx |
|---|---|---|
| | IPv6 ADDRESS OF APPARATUS | yyyy:yyyy:yyyy:yyyy<br>zzzz:zzzz::zzzz:zzzz |

FIG.15

| IP ADDRESS OF APPARATUS TO BE ACCELERATED | | xxx.xxx.xxx.xxx | yyyy:yyyy:yyyy:yyyy | zzzz:zzzz::zzzz:zzzz |
|---|---|---|---|---|
| SECURITY POLICY FOR EACH IP ADDRESS | DESTINATION IP ADDRESS | ALL | ALL | ALL |
| | SSL ENCRYPTION METHOD | 3DES | 3DES | 3DES |
| | SSL PORT NUMBER | 443 | 443 | 443 |
| | SESSION TIMEOUT TIME | 60 MIN | 60 MIN | 60 MIN |
| | ------- | | | |

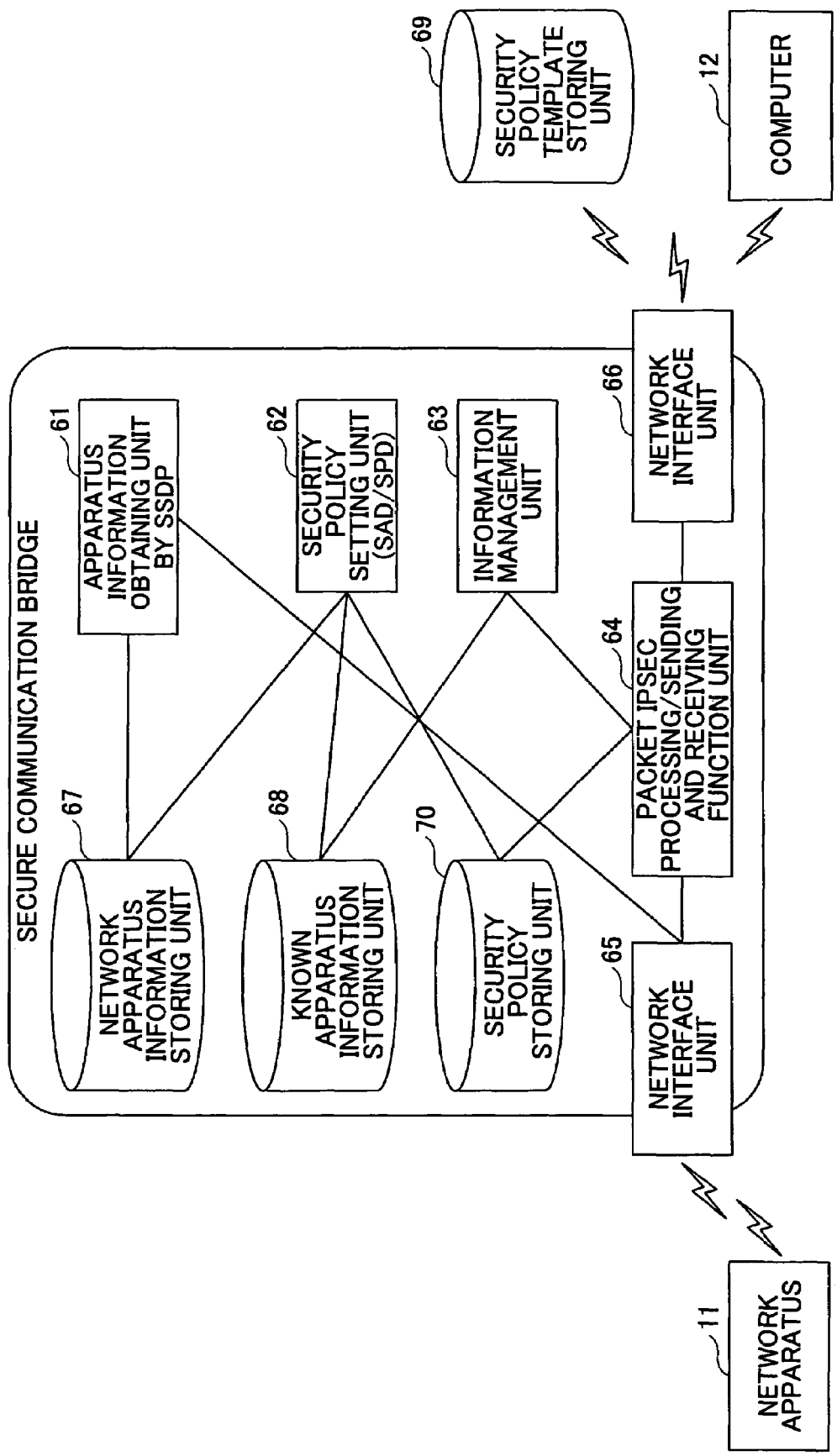

FIG.21

| NETWORK APPARATUS INFORMATION | INFORMATION FOR SPECIFYING MODEL (PRODUCT NAME, ETC.) | ABC100 |
|---|---|---|
| | IPv4 ADDRESS OF APPARATUS | xxx.xxx.xxx.xxx |
| | IPv6 ADDRESS OF APPARATUS | yyyy:yyyy:yyyy:yyyy |

FIG.22

| KNOWN APPARATUS INFORMATION | INFORMATION FOR SPECIFYING MODEL (PRODUCT NAME, ETC.) | ABC100 | ABC101 | ... |
|---|---|---|---|---|
| | NECESSITY OF IPSEC ACCELERATION | NECESSARY | UNNECESSARY | |

FIG.23

| SECURITY POLICY TEMPLATE FOR KNOWN APPARATUS | INFORMATION FOR SPECIFYING MODEL (PRODUCT NAME, ETC.) | ABC100 | ABC102 | ... |
|---|---|---|---|---|
| | KEY SETTING METHOD SUITABLE FOR CORRESPONDING APPARATUS | IKE | IKE | |
| | ENCAPSULATION MODE SUITABLE FOR CORRESPONDING APPARATUS | ESP | ESP+AH | |
| | ENCRYPTION METHOD SUITABLE FOR CORRESPONDING APPARATUS | 3DES | AES | ------ |

FIG.24

| IP ADDRESS OF APPARATUS TO BE ACCELERATED | | SECURE COMMUNICATION BRIDGE | xxx.xxx.xxx.xxx | yyyy:yyyy:yyyy:yyyy |
|---|---|---|---|---|
| SECURITY POLICY (SAD/SPD) FOR EACH IP ADDRESS | DESTINATION IP ADDRESS | COMPUTER OF MANAGER | ALL | ALL |
| | KEY SETTING METHOD | USE KNOWN KEY | IKE | IKE |
| | ENCAPSULATION MODE | ESP+AH | ESP | ESP |
| | ENCRYPTION METHOD | AES | 3DES | 3DES |

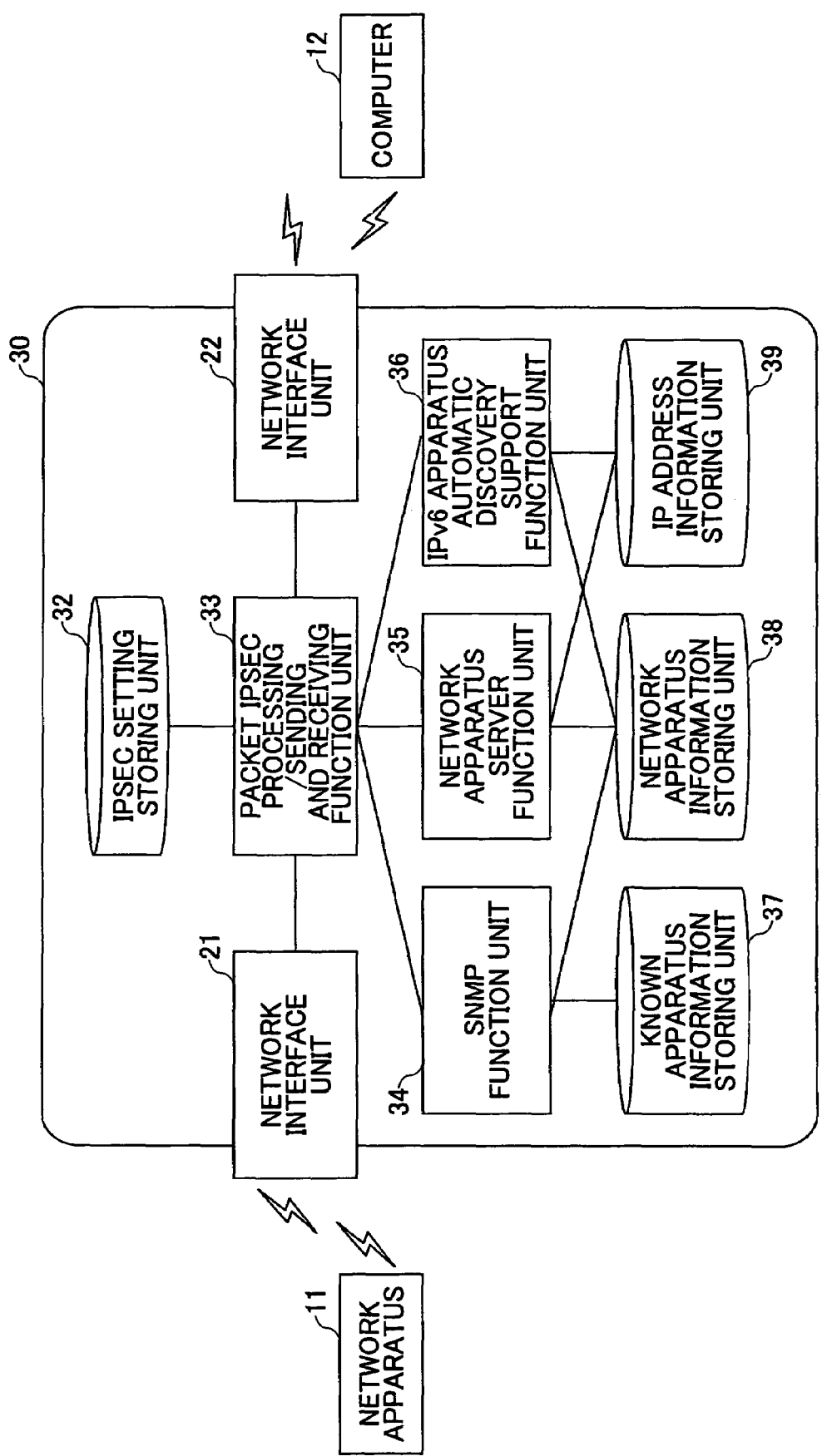

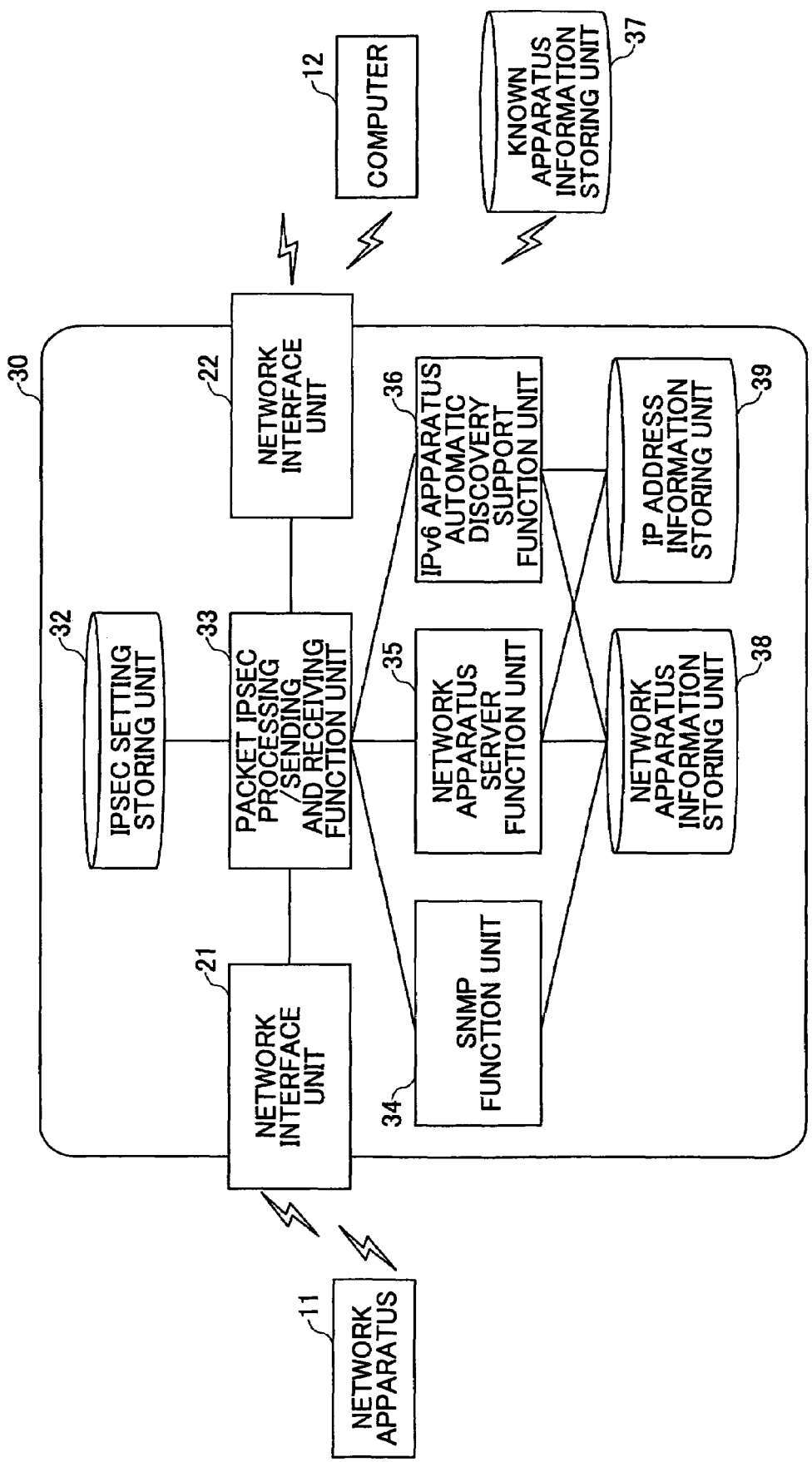

FIG.30

| | ITEM | |
|---|---|---|
| PRINTER INFORMATION | IDENTIFICATION NUMBER | 001 |
| | IPv6 COMMUNICATION AVAILABILITY | NO |
| | IPSEC COMMUNICATION AVAILABILITY | NO |
| | PRINTER MODEL | ABC123 |
| | IPv4 ADDRESS | xxx.xxx.xxx.xxx |
| | IPv6 ADDRESS | yyyy:yyyy::yyyy:yyyy zzzz:zzzz::zzzz:zzzz |

FIG.31

| | ITEM | |
|---|---|---|
| KNOWN APPARATUS INFORMATION | MODEL IDENTIFICATION NAME | abc123 |
| | IPv6 COMMUNICATION AVAILABILITY | NO |
| | IPSEC COMMUNICATION AVAILABILITY | NO |

FIG.32

| ITEM | | aaaa:aaaa::aaaa:aaaa | bbb.bbb.bbb.bbb | cccc:cccc::cccc:cccc |
|---|---|---|---|---|
| IP ADDRESS INFORMATION | IP ADDRESS | aaaa:aaaa::aaaa:aaaa | bbb.bbb.bbb.bbb | cccc:cccc::cccc:cccc |
| | CONNECTION PERMITTED/ NOT-PERMITTE | PERMITTED | PERMITTED | PERMITTED |
| | CONTROL CONNECTION PERMITTED/ NOT-PERMITTED | PERMITTED | PERMITTED | PERMITTED |
| | NETWORK APPARATUS SIDE IP ADDRESS OF NETWORK APPARATUS SERVER | NONE | NONE | ddd.ddd.ddd.ddd |

FIG.33

| IPSEC SETTING | | ITEM | | |
|---|---|---|---|---|
| | | IP ADDRESS OF APPARATUS TO BE ACCELERATED | xxx.xxx.xxx.xxx | yyyy.yyyy.yyyy.yyyy |
| | SPD | KEY SETTING METHOD | MANUAL SETTING | IKE |
| | | ENCAPSULATION MODE | ESP | ESP+AH |
| | | SENDING/RECEIVING IP BLOCK | hhh.hhh.hhh.hhh/ii | jjjj.jjjj.jjjj.jjjj/kk |
| | SAD | KEY | oooooo | AUTOMATIC |

COMMUNICATION APPARATUS, COMMUNICATION METHOD, COMMUNICATION PROGRAM AND RECORDING MEDIUM

BACKGROUND OF THE INVENTION

1. Field of the Invention

The present invention relates to a communication apparatus for providing IPSec communication and the like to an information processing apparatus such as an image forming apparatus.

2. Description of the Related Art

Currently, a technology called IPSec (Security Architecture for Internet Protocol) exists. This protocol is used for securing IP (Internet Protocol) that is used in the Internet and the like. This protocol has functions for encrypting communications of IP and for authenticating communications and the like.

For performing the IPSec communication, since computational processing for encryption is performed, large amount of CPU resources are consumed. Therefore, when using the IPSec, high speed communication is not expected unless the CPU is upgraded.

Therefore, for realizing the IPSec in an apparatus using a small CPU, it has been considered to use a hardware accelerator from the past.

The hardware accelerator is largely classified into two types. One is a coprocessor type. The accelerator of the coprocessor type is implemented in the apparatus that performs the IPSec communication. The coprocessor is embedded, separately from the CPU, as a circuit for performing IPSec processing. When performing the IPSec communication, processing for encryption is not performed in the CPU, but is performed by the coprocessor that is an IPSec processing specific circuit. Since the processing is not performed in the general CPU, but performed in the specific hardware, high speed processing can be performed.

Another type of hardware accelerator is one that is inserted between an apparatus that performs IPSec communication and a communication route.

In this type, the apparatus that needs IPSec communication performs IP communication as usual, and packets that are output from the apparatus pass through the hardware accelerator so that the packets are transmitted to the external network. In addition, packets flow into the apparatus from the network after passing through the hardware accelerator.

The hardware accelerator converts the IPSec packet into a normal IP packet, and converts the IP packet to be transmitted to the external network into the IPSec packet.

Since the bridge type IPSec accelerator basically realizes the IPSec communication by itself, high speed processing is possible and the IPSec accelerator does not affect the apparatus. By the way, following documents relate to the prior art.

[Patent document 1] Japanese Laid-Open Patent Application NO. 2002-317148.

[Patent document 2] Japanese Laid-Open Patent Application NO. 2003-78813.

[Patent document 3] Japanese Laid-Open Patent Application NO. 2004-86590.

[Patent document 4] Japanese Laid-Open Patent Application NO. 2002-251071.

However, for using the bridge type accelerator, settings for the apparatus to be connected should be made manually, and there is a case where settings may be necessary for the apparatus to be connected. Thus, there is a problem in that time and effort are necessary in using the accelerator.

SUMMARY OF THE INVENTION

An object of the present invention is to provide a communication apparatus, a communication method, a communication program and a recording medium for providing secure communication in which the apparatus to be connected to the communication apparatus is not aware of the secure communication, and time and effort are not necessary in making settings.

The object can be achieved by a communication apparatus that is connected to an information processing apparatus, including:

an information processing apparatus discovery unit configured to discover the information processing apparatus;

a secure communication packet conversion unit configured to convert a non-secure communication packet transmitted by the discovered information processing apparatus into a secure communication packet; and a non-secure communication packet conversion unit configured to convert the secure communication packet destined for the information processing apparatus into the non-secure communication packet.

The communication apparatus may include an information obtaining unit configured to obtain information processing apparatus information on the information processing apparatus from the discovered information processing apparatus.

The communication apparatus may include:

an information processing apparatus information storing unit configured to store information processing apparatus information of known information processing apparatuses; and a unit configured to determine whether to perform conversion processing of the secure communication packet for the discovered information processing apparatus based on the information processing apparatus information obtained by the information obtaining unit and information stored in the information processing apparatus information storing unit.

Also, the communication apparatus may include:

a setting information storing unit configured to store secure communication setting information for each known information processing apparatus; and a unit configured to obtain secure communication setting information corresponding to the discovered information processing apparatus from the setting information storing unit, and make setting for secure communication for the discovered information processing apparatus using the obtained secure communication setting information.

In addition, the communication apparatus may include a unit configured to update the information processing apparatus information stored in the information processing apparatus information storing unit and the secure communication setting information stored in the setting information storing unit based on a request from an external apparatus.

In the communication apparatus, wherein the information processing apparatus discovery unit obtains an IP address of the information processing apparatus by monitoring communication for setting the IP address for the information processing apparatus. The communication for setting the IP address may be communication of DHCP.

In addition, the communication apparatus may include:

an IPv6 address setting unit configured to set an IPv6 address to the communication apparatus when the information processing apparatus does not support IPv6;

a pseudo IPv4 packet transmission unit configured to convert a destination of a packet destined for the IPv6 address into an IPv4 address of the information processing apparatus and transmit the converted packet to the information processing apparatus; and a pseudo IPv6 packet transmission unit configured to convert a source of a packet transmitted by the information processing apparatus into the IPv6 address and transmit the converted packet.

The present may be also configured as a communication method corresponding to processing of the communication apparatus. In addition, the present invention may be configured as a communication program for causing the communication apparatus to perform each step of the communication method.

According to the present invention, a technology for providing secure communication can be realized in which the apparatus to be connected to the communication apparatus is not aware of the secure communication, and time and effort are not necessary for making settings.

BRIEF DESCRIPTION OF THE DRAWINGS

Other objects, features and advantages of the present invention will become more apparent from the following detailed description when read in conjunction with the accompanying drawings, in which:

FIG. 4 shows a general outline of the first embodiment;

FIG. 5 shows a configuration of the secure communication bridge in the first embodiment;

FIG. 6 shows a configuration of the secure communication bridge in the first embodiment;

FIG. 7 shows an example of data stored in the network apparatus information storing unit 46.

FIG. 8 shows an example of data stored in the known apparatus information storing unit 47;

FIG. 9 shows an example of data stored in the security policy storing unit 48;

FIG. 12 shows a general outline of the second embodiment;

FIG. 13 shows a configuration of the secure communication bridge in the second embodiment;

FIG. 14 shows an example of data stored in the network apparatus information storing unit 56;

FIG. 15 shows an example of data stored in the security policy storing unit 57;

FIG. 20 shows a configuration of the secure communication bridge in the third embodiment;

FIG. 21 shows an example of data stored in the network apparatus information storing unit 67;

FIG. 22 shows an example of data stored in the known apparatus information storing unit 68;

FIG. 23 shows an example of data stored in the security policy template storing unit 69;

FIG. 24 shows an example of data stored in the security policy storing unit 70;

FIG. 28 shows a configuration of the secure communication bridge of the fourth embodiment;

FIG. 29 shows a configuration of the secure communication bridge of the fourth embodiment;

FIG. 30 shows an example of information stored in the network apparatus information storing unit 38;

FIG. 31 shows an example of information stored in the known apparatus information storing unit 37;

FIG. 32 shows an example of information stored in the IP address information storing unit 39;

FIG. 33 shows information stored in the IPSec setting storing unit 32;

DETAILED DESCRIPTION OF THE PREFERRED EMBODIMENTS

In the following, embodiments of the present invention is described with reference to figures.

(General Configuration)

Figure 1:
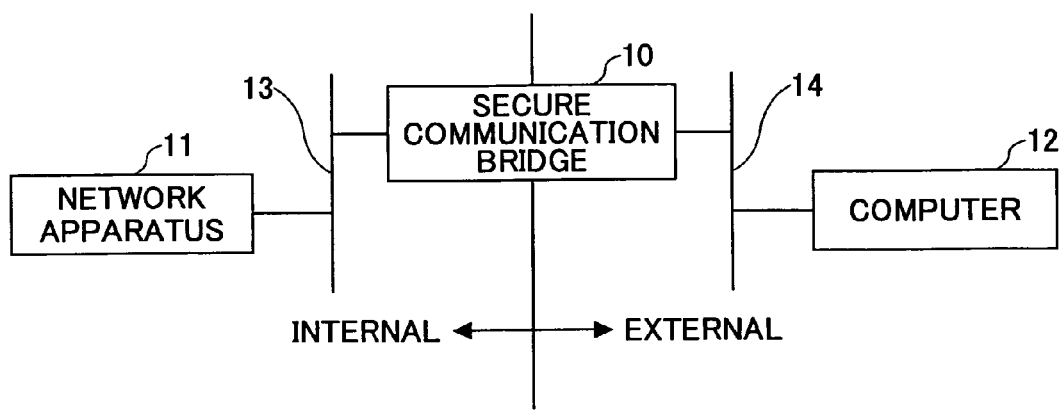
FIG. 1 shows a general configuration of the embodiment of the present invention.

FIG. 1 shows a general configuration of the embodiment of the present invention. FIG. 1 shows a secure communication bridge 10 that is an accelerator for performing secure communication such as IPSec and SSL (Secure Sockets Layer), a network apparatus 11, such as a printer, that is an object for the secure communication acceleration, a computer 12, an internal network 13 and an external network 14 that connect them.

The network apparatus 11 does not have a secure communication function such as IPSec, but only has a communication function for normal IP. The network apparatus 11 is an information processing apparatus including a network communication function. The network apparatus 11 may be an image forming apparatus such as a printer and a copy machine, a household electrical appliance, a computer or the like, for example. The internal network 13 connects between the network apparatus 11 and the secure communication bridge 10, and the external network 13 is connected to the secure communication bridge 10. Each of the internal network 13 and the external network 14 may be a wired network or a wireless network. But, it is desirable that the internal network 13 is a wired network.

The computer 12 having the secure communication function is connected to the external network 14. The secure communication bridge 10 has a function for converting a secure communication packet arrives from the external network 14 into a non-secure communication packet so as to transfer the packet to the network apparatus 11, and for converting the non-secure communication packet output from the network apparatus 11 into a secure communication packet so as to transfer the packet to the computer 12.

According to such a configuration, the network apparatus 11 appears to have the secure communication function from the viewpoint of the computer 12, but the network apparatus 11 itself performs communications with the computer 12 by the normal IP.

Figure 2:
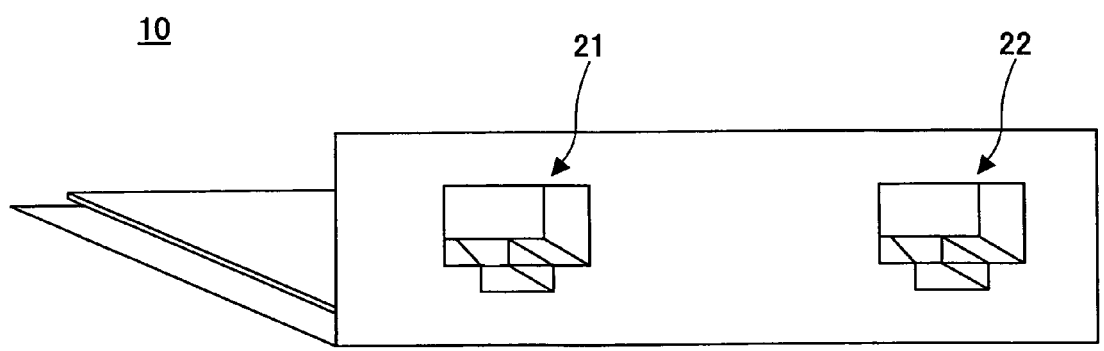
FIG. 2 shows an example of an external view of the secure communication bridge having two connectors.

FIG. 2 shows an example of an external view of the secure communication bridge 10. The secure communication bridge 10 includes two connectors 21 and 22. These connectors are RJ-45 interfaces, and can be connected to the Ethernet.

One of the two connectors 21 and 22 is connected to the internal network 13 and another is connected to the external network 14.

The connectors 21 and 22 are connected to a circuit board behind the connectors 21 and 22, on which circuit board a circuit for performing secure communication processing such as IPSec processing is provided.

Since the packets on which the secure communication processing is not performed flow into the internal network 13, tapping for the internal network cannot be prevented. Therefore, the secure communication bridge 11 can be connected via a specific route without using the general RJ-45 as the interface to the internal network, and the bridge may be embedded in the network apparatus 11.

Figure 3:
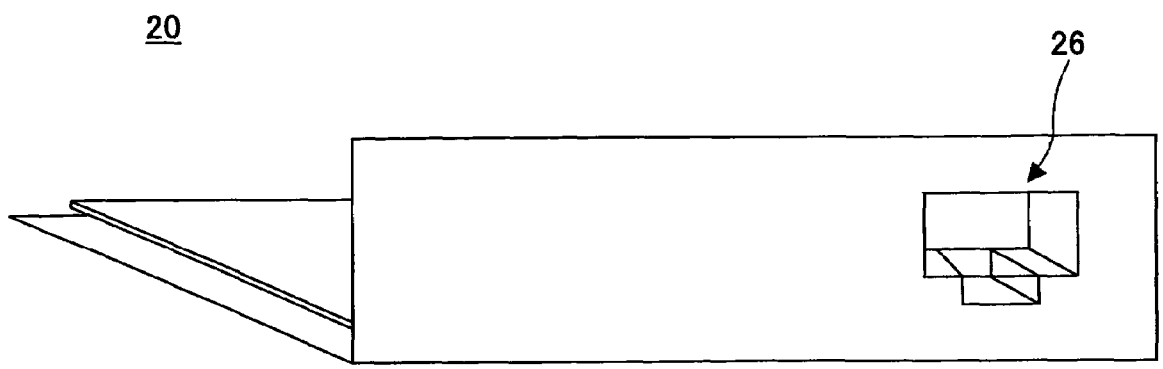
FIG. 3 shows an example of an external view of the secure communication bridge having one connector.

In such a case, as shown in the secure communication bridge 20 in FIG. 3, the bridge includes only one RJ-45 connector 26 that connects to the external network 14.

The secure communication bridge 20 may be utilized as a separate apparatus from the network apparatus 11. Alternatively, by configuring the secure communication bridge 20 such that the secure communication bridge 20 can be mounted in an extension slot of the network apparatus 11, power can be obtained from the network apparatus 11.

First Embodiment

First, the first embodiment of the present invention is described. As shown in FIG. 4, the first embodiment takes IPSec communication as an example of secure communication. In the first embodiment, apparatus information of the network apparatus 11 that is an object for acceleration is obtained using SNMP, and setting for IPSec communication is performed using the apparatus information.

FIG. 5 shows a configuration of the secure communication bridge 40 in the first embodiment. As shown in FIG. 5, the secure communication bridge 40 of the first embodiment includes an apparatus information obtaining unit 41 by SNMP, a security policy setting unit 42, a packet IPSec processing/sending and receiving function unit 43, network interface units 44 and 45, a network apparatus information storing unit 46, a known apparatus information storing unit 47, and a security policy storing unit 48.

The network apparatus information obtaining unit 41 by SNMP obtains, using SNMP, information of the network apparatus that is an object for acceleration. The security policy setting unit 42 sets a security policy for the network apparatus that is an object for IPSec acceleration based on the apparatus information obtained by the network apparatus information obtaining unit 41 and information stored in each storing unit. The packet IPSec processing/sending and receiving function unit 43 performs IPSec processing for packets based on the IP address of a received packet and the security policy. The network interface units 44 and 45 are function units for sending and receiving packets via the network.

The network apparatus information storing unit 46 stores network apparatus information obtained by the network apparatus information obtaining unit 41. The known apparatus information storing unit 47 stores known apparatus information such as catalog information of the network apparatus, for example. The security policy storing unit 48 stores security policies of network apparatuses that are objects for IPSec acceleration. These storing units can be realized as storing areas in a nonvolatile storing device. The known apparatus information storing unit 47 does not need to exist in the secure communication bridge 40. It may exist on the external network. The configuration in this case is shown in FIG. 6.

Next, examples of data stored in each storing unit are described. FIG. 7 shows an example of data stored in the network apparatus information storing unit 46. As shown in FIG. 7, the network apparatus information storing unit 46 stores information (to be referred to as model information hereinafter) for specifying a model of the network apparatus such as a product name and the like, an IPv4 address and an IPv6 address of the network apparatus. FIG. 8 shows an example of data stored in the known apparatus information storing unit 47. As shown in FIG. 8, the known apparatus information storing unit 47 stores necessity of IPSec acceleration for each model. The known apparatus information storing unit 47 may store information of presence or absence of the IPSec communication function instead of the necessity of the acceleration.

FIG. 9 shows an example of data stored in the security policy storing unit 48. As shown in FIG. 9, the security policy storing unit 48 stores a security policy for performing IPSec communication for each IP address of the apparatus that is an object of the acceleration. IPSec acceleration is performed for each network apparatus of the IP address according to the corresponding security policy.

Figure 10:
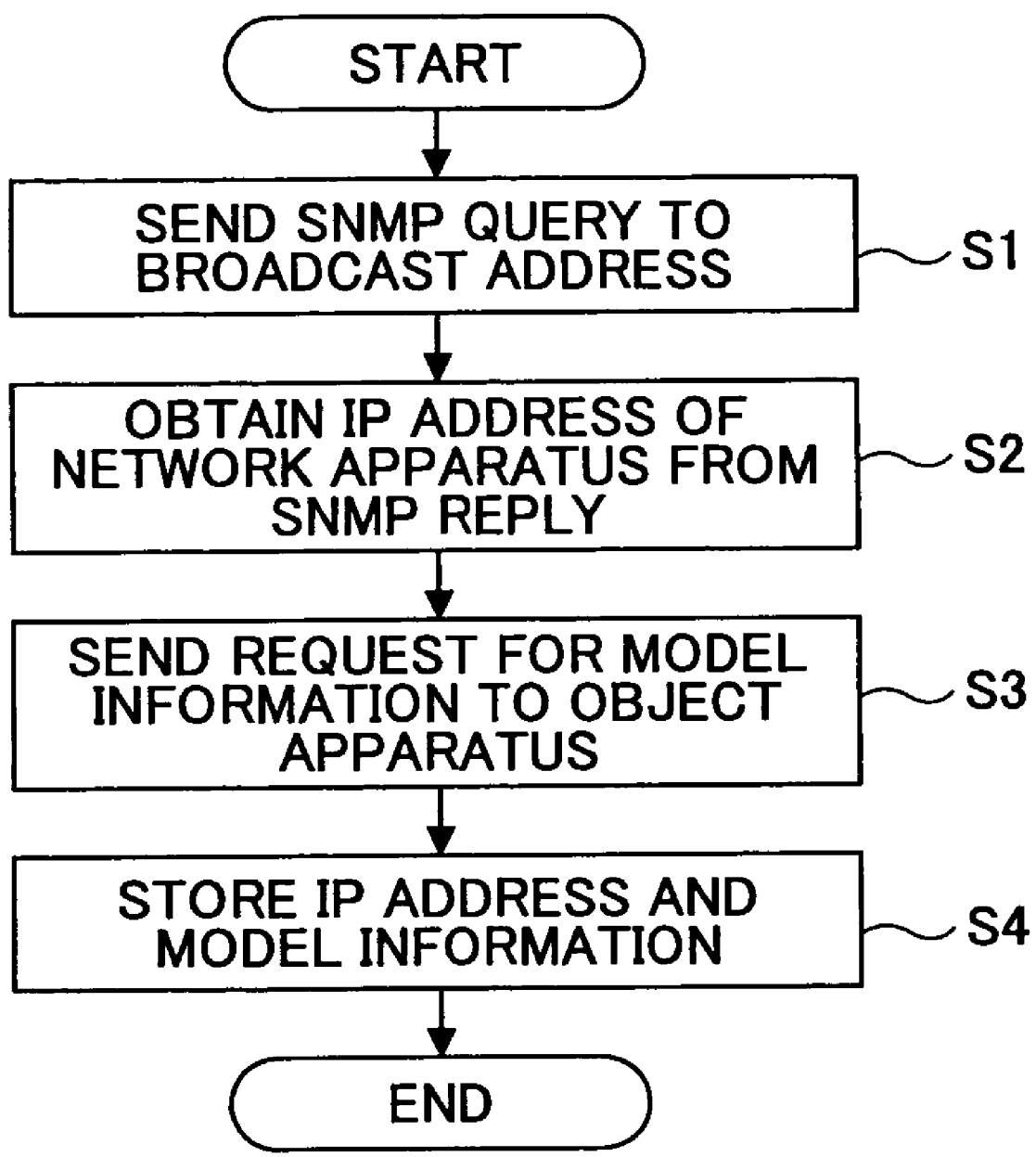
FIG. 10 is a figure for explaining processing for the secure communication bridge to obtain the network apparatus information using SNMP.

Next, processing for the secure communication bridge 40 to obtain the network apparatus information using the SNMP is described with reference to a flowchart shown in FIG. 10. This processing is executed by the network apparatus information obtaining unit 41.

First, the secure communication bridge 40 sends a SNMP query to the broadcast address via the network interface unit 44 in step S1. In step S2, when the secure communication bridge 40 receives a SNMP reply for the SNMP query, the secure communication bridge 40 obtains an IP address of the network apparatus 11 from the SNMP reply. Then, the secure communication bridge 10 sends a request for model information (product name and the like) to the network apparatus 11 using SNMP in step S3. The secure communication bridge 10 stores the IP address and the model information received from the network apparatus 11 in the network apparatus information storing unit 46 in step S4.

Figure 11:
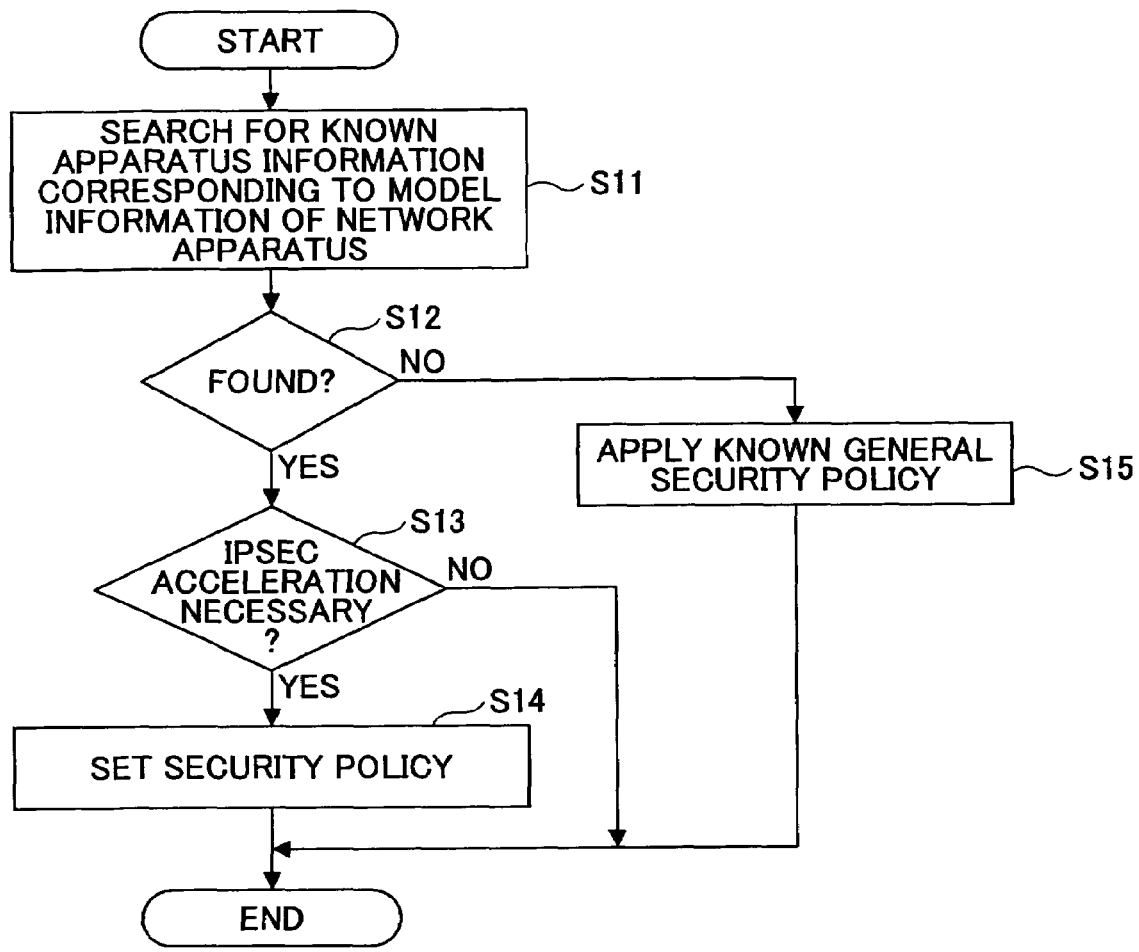
FIG. 11 is a figure for explaining processing for setting the security policy based on the obtained network apparatus information.

Next, processing for setting the security policy based on the obtained network apparatus information is described with reference to a flowchart of FIG. 11. This processing is performed by the security policy setting unit 42.

The security policy setting unit 42 searches, based on the model information stored in the network apparatus information storing unit 46, the known apparatus information storing unit 47 for information corresponding to the model information in step S11. When the information corresponding to the model information is found (Yes in step S12), the security policy setting unit 42 determines whether the corresponding network apparatus needs IPSec acceleration based on the information in step S13. In this step, if the known apparatus information storing unit 47 stores presence or absence of the IPSec function, the security policy setting unit 42 determines that the IPSec acceleration is not necessary when the IPSec function exists, and the security policy setting unit 42 determines that the IPSec acceleration is necessary when the IPSec function does not exist. When it is determined that the IPSec acceleration is necessary, the security policy setting unit 42 sets the security policy in the security policy storing unit 48 associating the security policy with the IP address of the object network apparatus. Accordingly, IPSec acceleration can be performed for the network apparatus. As the security policy, one that is predetermined can be used. For example, as shown in FIG. 9, setting is made such that IPSec acceleration can be performed for every destination IP address.

When No in step S13, that is, when it is determined that IPSec acceleration is not necessary, setting of the security policy is not performed. When No in step S12, that is, when known apparatus information for the object network apparatus is not found, a known general security policy is applied for the network apparatus to set the security policy in step S15.

By performing the above-mentioned setting, IPSec acceleration can be performed. That is, when a source IP address of a packet received from the internal network is included in IP addresses set in the security policy storing unit 48, the secure communication bridge 40 performs IPSec processing and outputs the packet. In addition, when a packet received from the external network is an IPSec communication packet destined for the object network apparatus, the secure communication bridge 40 converts the IPSec communication packet into an IP packet, and when the received packet is not the IPSec packet, the secure communication bridge 40 sends the packet to the destination as it is.

In the above-mentioned example, the network apparatus information obtaining unit 41 uses the SNMP. Alternatively, the network apparatus information obtaining unit 41 may use SSDP, WS-Discovery, Bonjour (Rendezvous) and the like. In addition, the IP address of the network apparatus 11 can be obtained by monitoring communication for setting the IP address of the network apparatus 11. The communication for setting the IP address is DHCP (Dynamic Host Configuration Protocol) communication, communication for setting IPv6 stateless address, and the like. Some examples are explained in other embodiments.

The secure communication bridge 40 can be configured by hardware. Alternatively, the secure communication bridge 40 can be realized by loading a program, on a computer including a CPU and a memory, for performing functions of the network apparatus information obtaining unit 41, the security policy setting unit 42, and the IPSec processing/sending and receiving function unit 43. The program can be provided by storing it in a recording medium such as a memory, or can be provided by downloading it from the network. In the same way, in other embodiments, the secure communication bridge can be configured by hardware, and can be realized by executing a program on the computer.

Second Embodiment

Next, the second embodiment of the present invention is described. As shown in FIG. 12, the second embodiment takes SSL communication as an example of secure communication. In this embodiment, the IP address of the network apparatus 11 that is an object for acceleration is obtained by monitoring DHCP access, so that setting for the SSL communication is made.

That is, when the network apparatus 11 has a function for setting the IP address automatically using DHCP, the network apparatus 11 communicates with the DHCP server 15 after the network apparatus 11 is launched so that the IP address is automatically set in the network apparatus 11. The secure communication bridge 50 monitors DHCP packets. When detecting a response from the DHCP server 15, the secure communication bridge 50 analyzes the information in the packet so as to automatically recognize the IP address to be assigned to the network apparatus 11.

FIG. 13 shows a configuration of the secure communication bridge 50 in the second embodiment. As shown in FIG. 13, the secure communication bridge 50 of the second embodiment includes a network apparatus information obtaining unit 51 by DHCP communication monitoring, a security policy setting unit 52, a packet SSL processing/sending and receiving function unit 53, network interface units 54 and 55, a network apparatus information storing unit 56, and a security policy storing unit 57.

The network apparatus information obtaining unit 51 by DHCP communication monitoring obtains information (IP address) of the network apparatus 11 that is an object for acceleration by monitoring DHCP communication of the network apparatus 11. The security policy setting unit 52 sets a security policy for the network apparatus 11 that is an object for SSL acceleration based on the apparatus information obtained by the network apparatus information obtaining unit 51. The packet SSL processing/sending and receiving function unit 53 performs SSL processing for a received packet based on the IP address of the received packet and the security policy. In addition, the network interface units 54 and 55 are function units for performing sending and receiving of the packet via the network.

The network apparatus information storing unit 56 stores the network apparatus information (IP address) obtained by the network apparatus information obtaining unit 51. The security policy storing unit 57 stores security policies of network apparatuses that are objects for SSL acceleration by the security policy setting unit 52. These storing units can be realized as storing areas in a nonvolatile storing device.

Next, an example of data stored in each storing unit is described. FIG. 14 shows an example of data stored in the network apparatus information storing unit 56. As shown in FIG. 14, the network apparatus information storing unit 56 stores an IPv4 address and an IPv6 address of the network apparatus. FIG. 15 shows an example of data stored in the security policy storing unit 57. As shown in FIG. 15, the security policy storing unit 52 stores the security policy for performing SSL communication for each IP address of the apparatus that is the object for acceleration.

Figure 16:
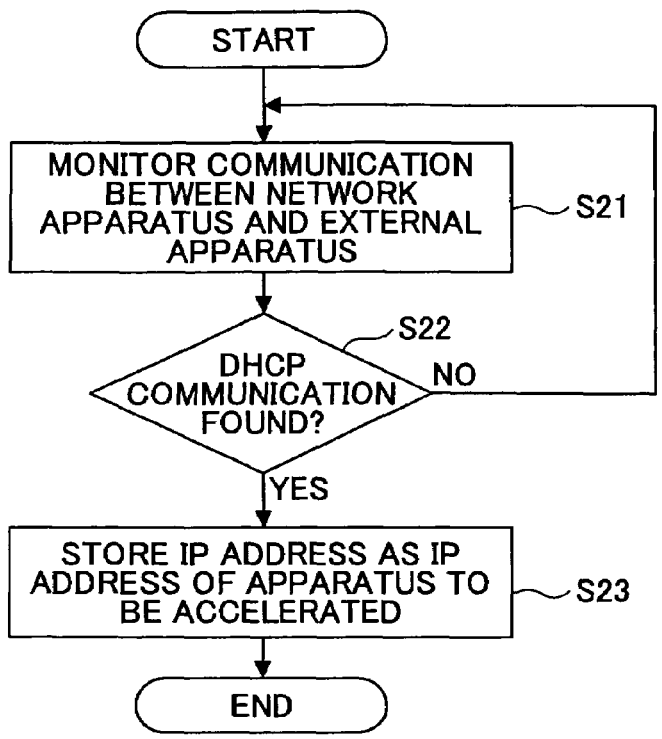
FIG. 16 is a figure for explaining processing for the secure communication bridge to obtain the IP address of the network apparatus by monitoring the DHCP communication.

Next, processing for the secure communication bridge 50 to obtain the IP address of the network apparatus by monitoring the DHCP communication is described with reference to a flowchart of FIG. 16. This processing is executed by the network apparatus information obtaining unit 51.

In step S21, the secure communication bridge 50 monitors communication packets between an network apparatus 11 in the internal network and an external apparatus. When the secure communication bridge 50 detects that the communication packet is for DHCP communication and that the communication packet includes an IP packet to be set in the network apparatus 11 (Yes in step S22), the secure communication bridge 50 obtains the IP address assigned to the network apparatus 11 from the packet of the DHCP communication, and stores the IP address in the network apparatus information storing unit 56 as an IP address for acceleration in step S23.

Figure 17:
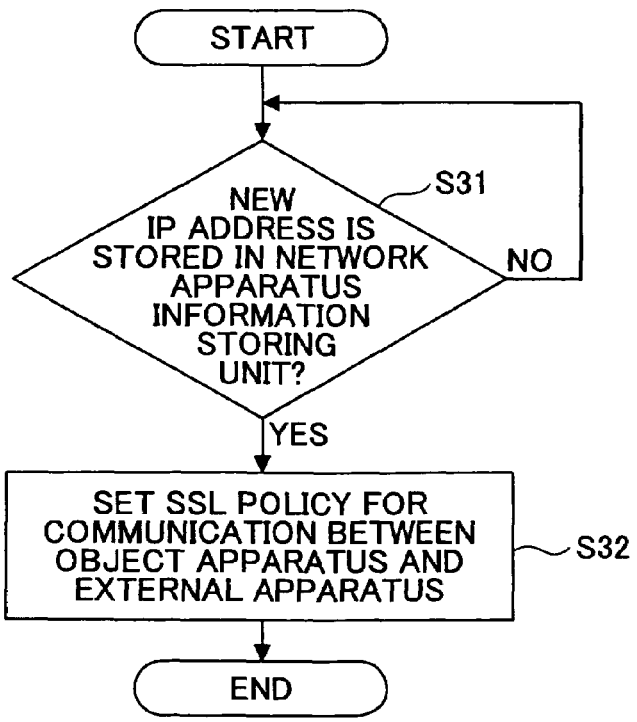
FIG. 17 is a figure for explaining processing for setting the security policy based on the obtained network apparatus information.

Next, processing for setting the security policy based on the obtained network apparatus information is described with reference to a flowchart of FIG. 17. This processing is performed by the security policy setting unit 52.

When the security policy setting unit 52 detects that a new IP address is set in the network apparatus information storing unit 56 (Yes in step S31), the security policy setting unit 52 sets a security policy for SSL communication in the security policy storing unit 57 associating the security policy with the IP address. Accordingly, SSL acceleration is performed for an network apparatus 11 having the IP address. As the security policy, one that is predetermined can be used. For example, as shown in FIG. 15, the security policy is set such that SSL acceleration can be performed for every destination IP address.

By performing the above-mentioned setting, SSL acceleration can be performed. That is, when a source address of a packet received from the internal network is included in IP addresses set in the security policy storing unit 57, the secure communication bridge 50 sends the packet after performing SSL processing. When a packet received from the external network is a SSL packet, the secure communication bridge converts the SSL packet into an IP packet.

Third Embodiment

Figure 18:
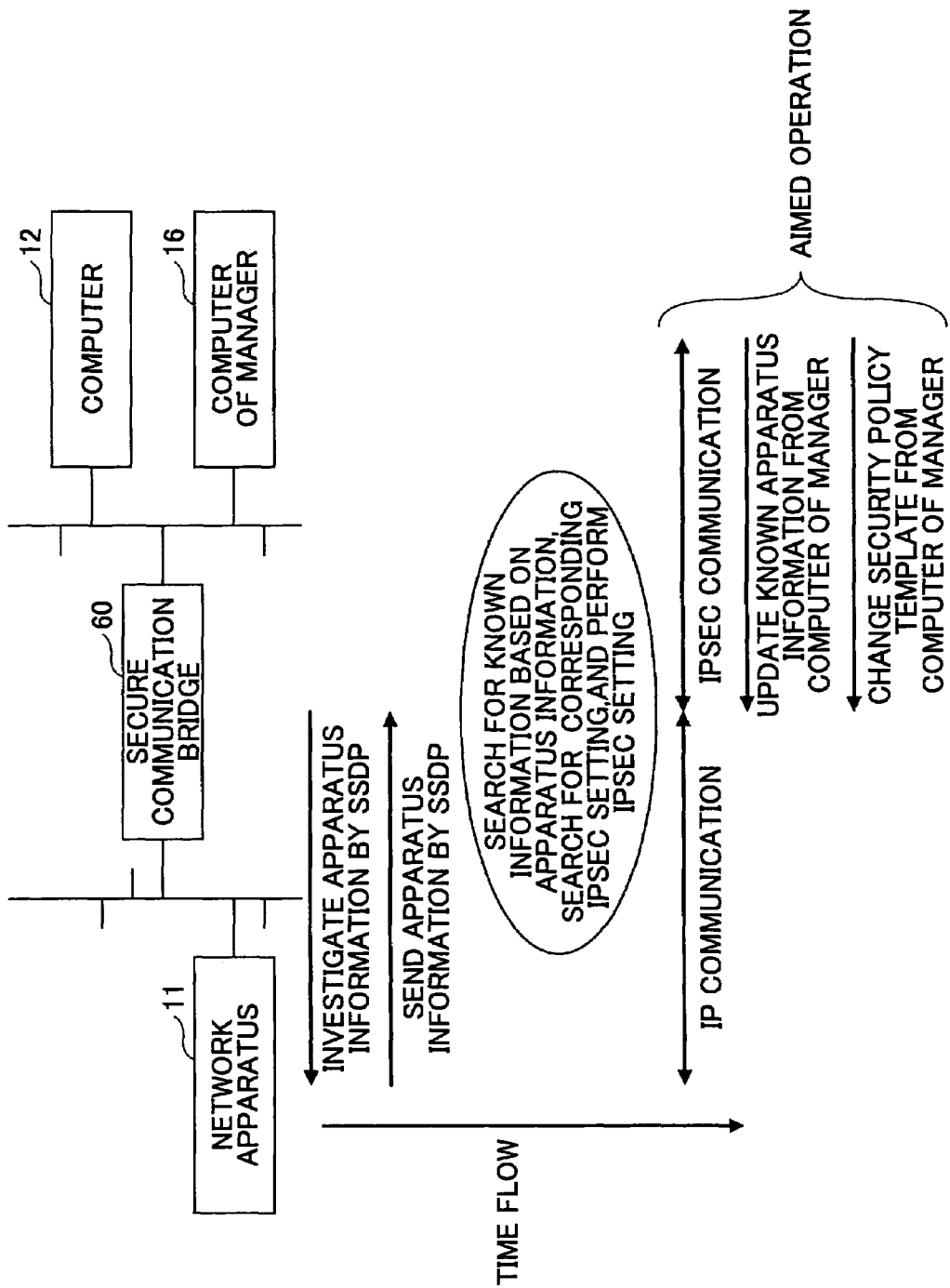
FIG. 18 shows a general outline of the third embodiment.

Next, the third embodiment of the present invention is described. As shown in FIG. 18, the third embodiment takes IPSec communication as an example of secure communication. In the third embodiment, apparatus information of the network apparatus 11 that is an object for acceleration is obtained using SSDP (Simple Service Discovery Protocol), and setting for IPSec communication is performed using the apparatus information. In addition, information of the known apparatus information and the like can be updated from a computer of a manager.

Figure 19:
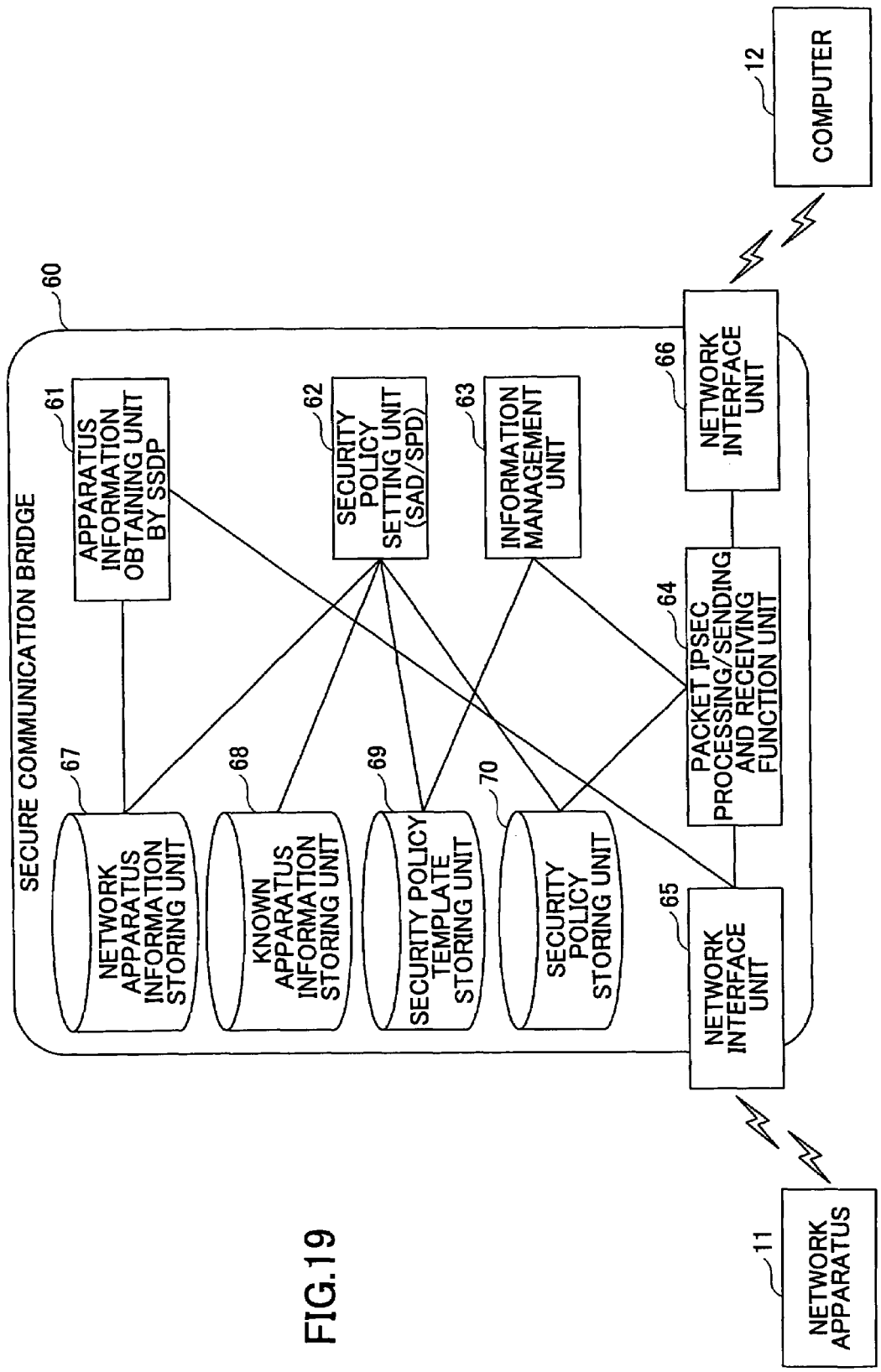
FIG. 19 shows a configuration of the secure communication bridge in the third embodiment.

FIG. 19 shows a configuration of the secure communication bridge 60 in the third embodiment. As shown in FIG. 19, the secure communication bridge 60 of the third embodiment includes an apparatus information obtaining unit 61 by SSDP, a security policy setting unit 62, an information management unit 63, a packet IPSec processing/sending and receiving function unit 64, network interface units 65 and 66, a network apparatus information storing unit 67, a known apparatus information storing unit 68, a security policy template storing unit 69 and a security policy storing unit 70.

The network apparatus information obtaining unit 61 by SSDP obtains, using SSDP, information of the network apparatus 11 that is an object for acceleration. The security policy setting unit 62 sets a security policy for the network apparatus 11 that is an object for IPSec acceleration based on the apparatus information obtained by the network apparatus information obtaining unit 61 and information stored in each storing unit. The information management unit 63 updates information in the known apparatus information storing unit 68 and the security policy template storing unit 69 based on instructions from the outside.

The packet IPSec processing/sending and receiving function unit 64 performs IPSec processing for a received packet based on the IP address of the received packet and the security policy. The network interface units 65 and 66 are function units for sending and receiving packets via the network.

The network apparatus information storing unit 67 stores network apparatus information obtained by the network apparatus information obtaining unit 61. The known apparatus information storing unit 68 stores known apparatus information such as catalog information of known network apparatuses, for example. The security policy template storing unit 69 stores the security policy for each known apparatus model. The security policy storing unit 70 stores security policies of network apparatuses that are objects for IPSec acceleration. These storing units can be realized as storing areas in a non-volatile storing device, for example. The known apparatus information storing unit 68 and the security policy template storing unit 69 do not need to exist in the secure communication bridge 60. These may exist on the external network. The configuration in a case where the security policy template storing unit 69 is placed in the external network is shown in FIG. 20.

Next, examples of data stored in each storing unit are described. As shown in FIGS. 21 and 22, data similar to data of the first embodiment are stored in the network apparatus information storing unit 67 and the known information storing unit 68. In addition, as shown in FIG. 23, the security policy template storing unit 69 stores security policies for IPSec communication for each model information of the known apparatus. In addition, as shown in FIG. 24, the security policy storing unit 70 stores predetermined security policies for performing IPSec communication for each IP address of the apparatus that is an object of the acceleration. The security policy storing unit 70 includes a security policy for IPSec communication between the secure communication bridge 60 and a computer of a manager for performing information setting for the known apparatus information storing unit 68 and the security policy template storing unit 69.

Figure 25:
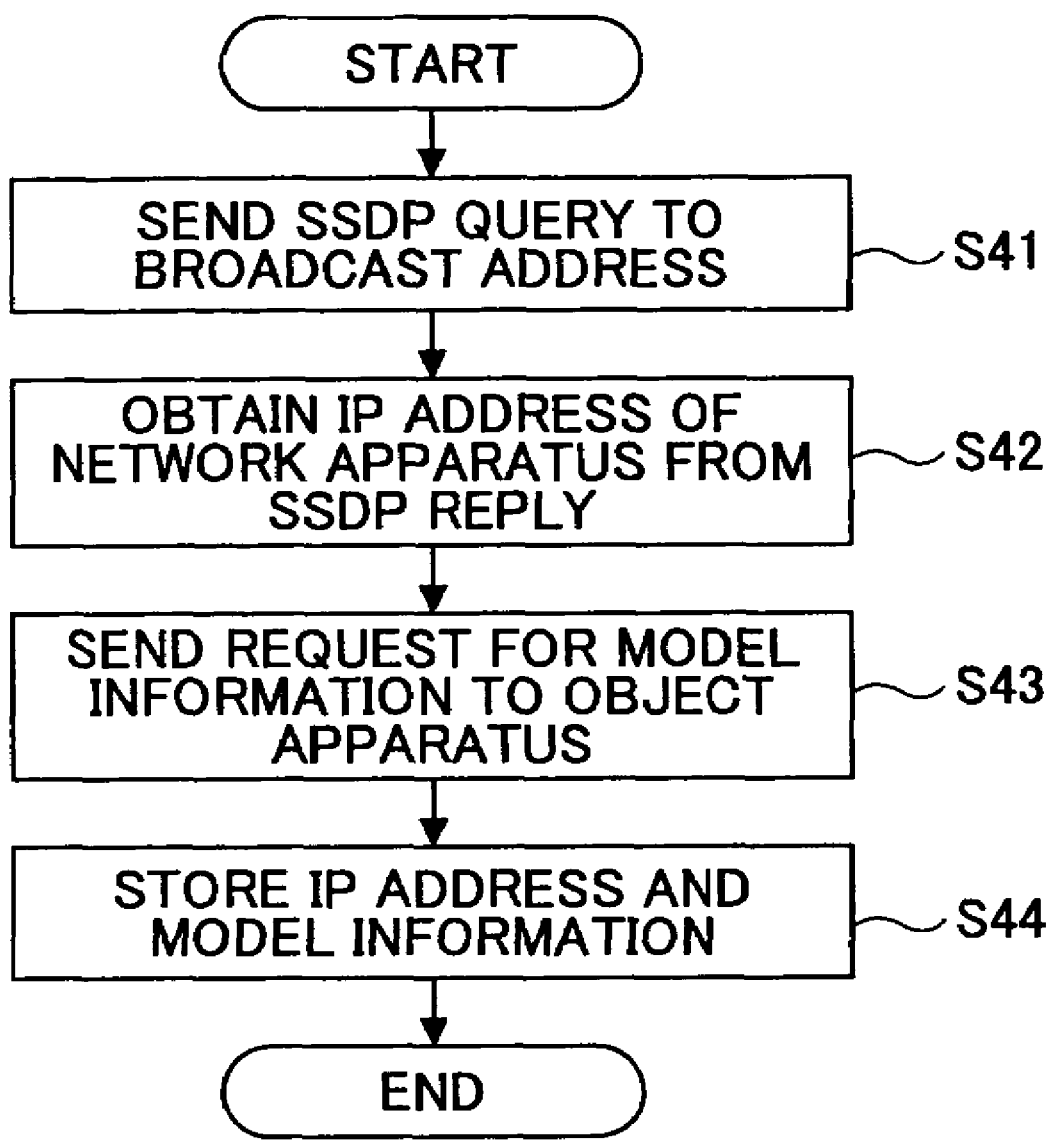
FIG. 25 is a figure for explaining processing for the secure communication bridge to obtain the network apparatus information using the SSDP.

Next, processing for the secure communication bridge 60 to obtain the network apparatus information using the SSDP is described with reference to a flowchart shown in FIG. 25. This processing is executed by the network apparatus information obtaining unit 61.

First, the secure communication bridge 60 sends a SSDP query to the broadcast address via the network interface unit 65 in step S41. In step S42, when the secure communication bridge 60 receives a SSDP reply for the SSDP query, the secure communication bridge 60 obtains an IP address of the network apparatus 11 from the SSDP reply. Then, the secure communication bridge 60 sends a request for model information of the network apparatus 11 based on the SSDP reply in step S43. The secure communication bridge 60 stores the IP address and the model information received from the network apparatus 11 in the network apparatus information storing unit 67 in step S44.

Figure 26:
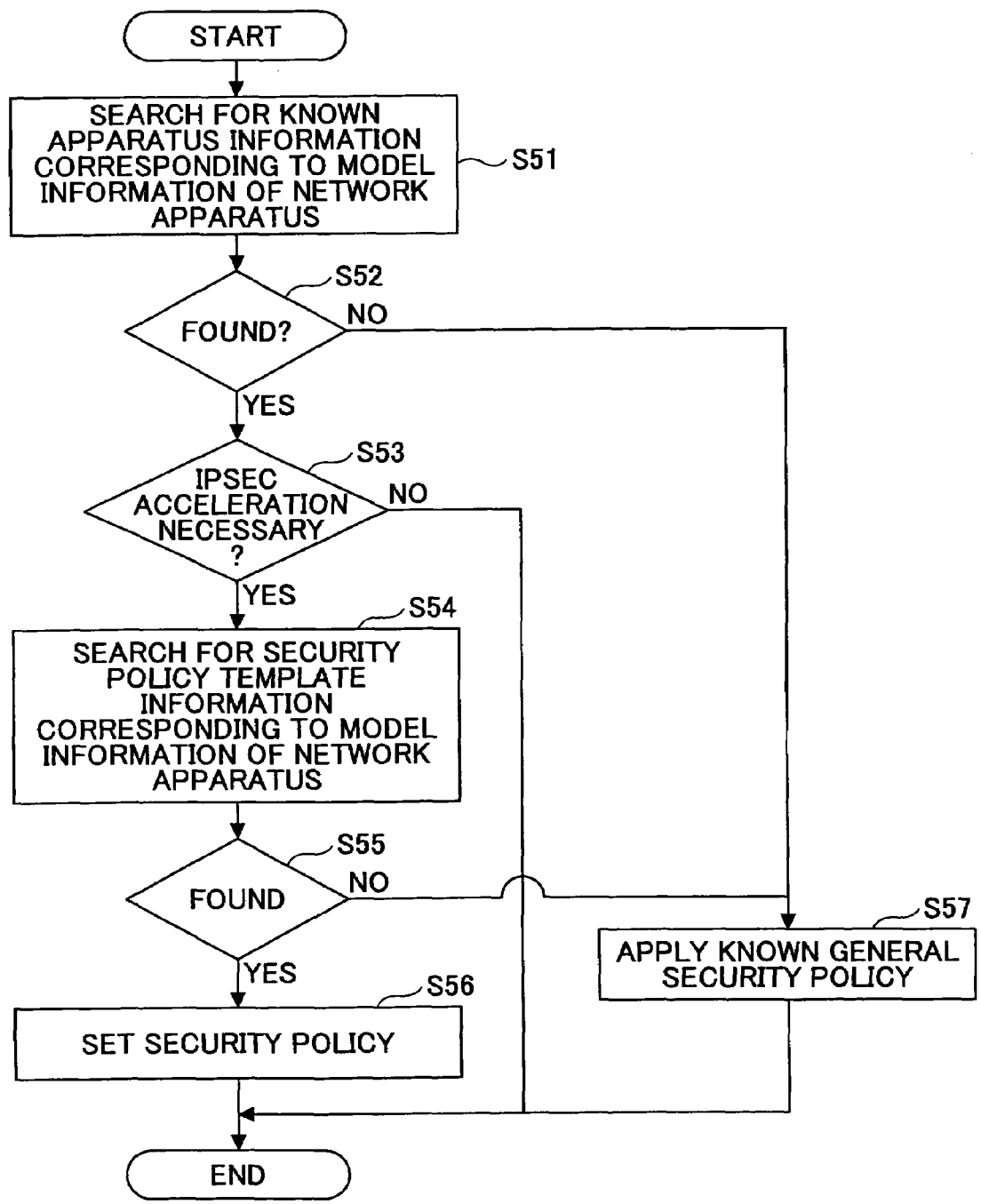
FIG. 26 is a figure for explaining processing for setting the security policy based on the obtained network apparatus information.

Next, processing for setting the security policy based on the obtained network apparatus information is described with reference to a flowchart of FIG. 26. This processing is performed by the security policy setting unit 62.

The security policy setting unit 62 searches, based on the model information stored in the network apparatus information storing unit 67, the known apparatus information storing unit 68 for information corresponding to the model information in step S51. When the information corresponding to the model information is found (Yes in step S52), the security policy setting unit 62 determines whether the corresponding network apparatus needs IPSec acceleration based on the information in step S53. In this step, if the known apparatus information storing unit 68 stores presence or absence of the IPSec function, the security policy setting unit 62 determines that the IPSec acceleration is not necessary when the IPSec function exists, and the security policy setting unit 62 determines that the IPSec acceleration is necessary when the IPSec function does not exist. When it is determined that the IPSec acceleration is necessary in step S53, the security policy setting unit 62 searches the security policy template storing unit 69 for a security policy corresponding to the model information of the object network apparatus 11 in step S54. When the security policy is found (Yes in step S55), the security policy setting unit 62 sets the security policy in the security policy storing unit 70 associating the security policy with the IP address of the subject network apparatus 11. Accordingly, IPSec acceleration can be performed for the network apparatus 11.

When No in step S53, that is, when it is determined that IPSec acceleration is not necessary, setting of the security policy is not performed. When No in step S52 or S55, a known general security policy is applied for the network apparatus and the security policy is set in step S57. By performing the above-mentioned setting, IPSec acceleration becomes available.

Figure 27:
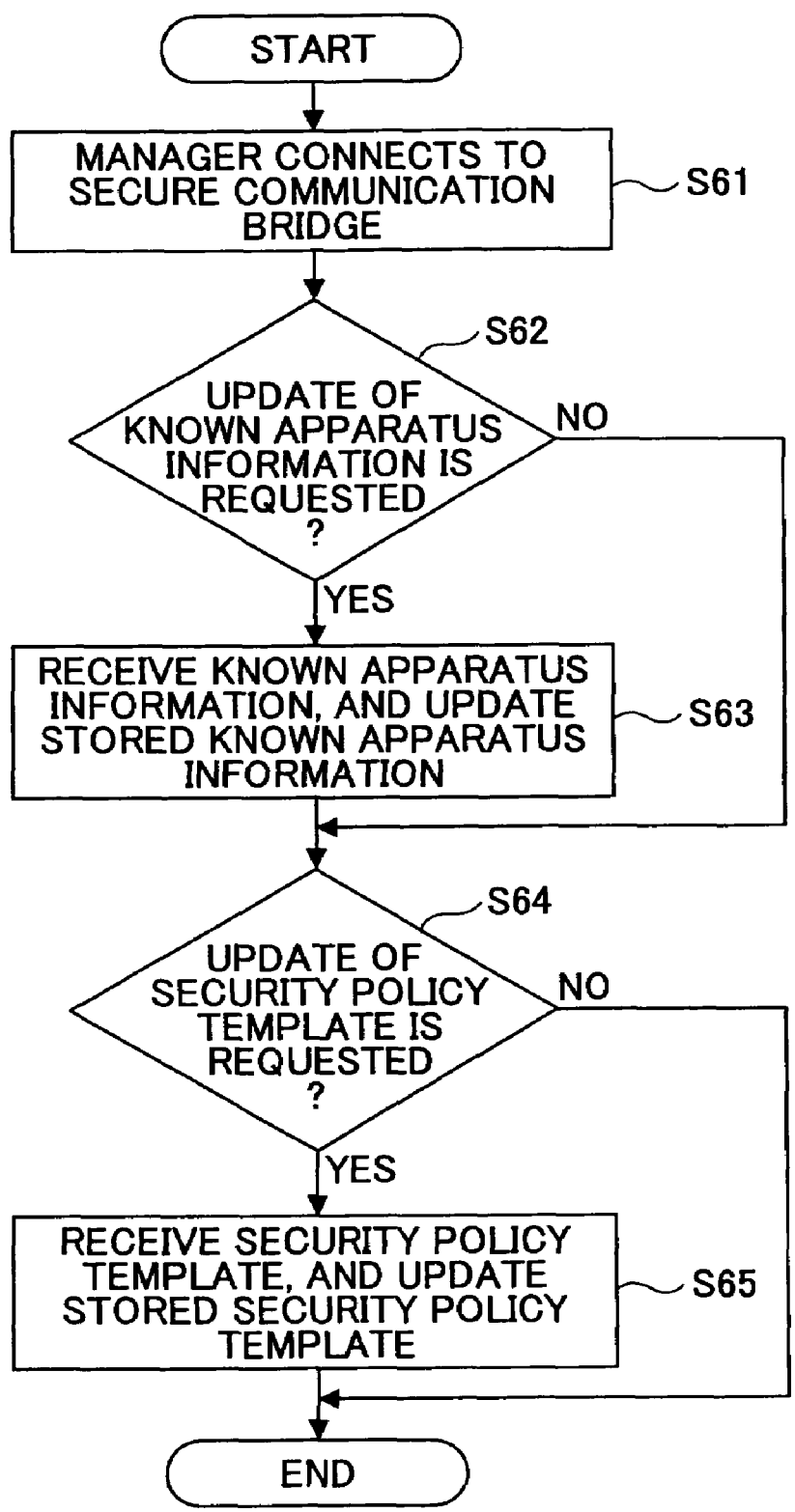
FIG. 27 is a figure for explaining processing for updating the known apparatus information and the security policy template from the external apparatus.

Next, processing for updating the known apparatus information and the security policy template from the external apparatus such as the computer of the manager is described with reference to FIG. 27. The following processing is performed by the information management unit 63.

First, in step S61, the security communication bridge 60 receives access from the external apparatus. At this time, an entry for the manager stored in the security policy storing unit 70 is used so that connection is established using IPSec communication.

Next, the information management unit 63 determines whether update of the known apparatus information is requested by the external apparatus in step S62. When update of the known apparatus information is requested (Yes in step S62), the information management unit 63 receives the known apparatus information via the network so as to update the known apparatus information stored in the known apparatus information storing unit 67 in step S63. Next, the information management unit 63 determines whether update of the security policy template is requested from the external apparatus in step S64. When update of the security policy template is requested (Yes in step S64), the information management unit 63 receives the security policy template corresponding to a particular model information via the network in step S65 so as to update the corresponding security policy template stored in the security policy template storing unit 69. Since the present embodiment uses the security policy template, the security policy can be set flexibly for each model.

Fourth Embodiment

Next, the fourth embodiment of the present invention is described. In the fourth embodiment, IPSec communication is taken as an example of secure communication. In the fourth embodiment, the IP address of the network apparatus 11 that is an object for acceleration is obtained using a network apparatus discovery function, and apparatus information of the network apparatus 11 is obtained using SNMP, so that setting for IPSec communication is performed. Further, the secure communication bridge 30 of the fourth embodiment includes a network apparatus server function.

A configuration of the secure communication bridge 30 of the fourth embodiment is described with reference to FIG. 28. FIG. 28 shows network interface units 21 and 22, an IPSec setting storing unit 32, a packet IPSec processing/sending and receiving function unit 33, a SNMP function unit 34, a network apparatus server function unit 35, an IPv6 apparatus automatic discovery function unit 36, a known apparatus information storing unit 37, a network apparatus information storing unit 38, and an IP address information storing unit 39.

In these units, the IPSec setting storing unit 32, the known apparatus information storing unit 37, the network apparatus information storing unit 38 and the IP address information storing unit 39 are databases. The databases are described later. These databases are stored in a nonvolatile storing devise, for example. The nonvolatile storing devise may store a program for operating the secure communication bridge 30.

The packet IPSec processing/sending and receiving function unit 33 sends and receives packets and performs processing on IPSec such as encryption for packets. The SNMP function unit 34 is a function unit for obtaining information from the network apparatus 11 using the SNMP (Simple Network Management Protocol). The network apparatus server function unit 35 is a function unit for configuring the security communication bridge 30 to function as a network apparatus server. The IPv6 apparatus automatic discovery support function unit 36 is a function unit for automatically discovering a network apparatus 11 supporting IPv6 or IPv4.

In the databases shown in FIG. 28, one that does not need to be directly mounted in the secure communication bridge 30 may exist on the external network. For example, as shown in FIG. 29, the known apparatus information storing unit 37 may be placed on the external network 14. Accordingly, hardware resource of the secure communication bridge 30 can be saved.

In the following, the databases are described. FIG. 30 shows an example of information stored in the network apparatus information storing unit 38 when a printer is taken as an example of the network apparatus 11. The information are obtained by the SNMP function unit and the like. The items include "identification number", "IPv6 communication availability", "IPSec communication availability", "printer model", "IPv4 address" and "IPv6 address".

The "identification number" is a number for identifying the printer. The "IPv6 communication availability" indicates whether the printer supports IPv6 communication. The "IPSec communication availability" indicates whether the printer supports IPSec communication. The "printer model" indicates a model of the printer. As to the "IPv6 communication availability" and the "IPSec communication availability", information obtained from the known apparatus information storing unit 37 may be set.

FIG. 31 shows an example of information stored in the known apparatus information storing unit 37. The known apparatus information storing unit 37 is used for knowing the "IPv6 communication availability" and the "IPSec communication availability" based on the model identification.

FIG. 32 shows an example of information stored in the IP address information storing unit 39. The IP address information is information on IP address of the secure communication bridge 30. That is, the secure communication bridge 30 may have plural IP addresses so that the secure communication bridge 30 can operate according to an accessed IP address. Items of information stored in the IP address information storing unit 39 include "IP address", "connection permitted/not-permitted", "control connection permitted/ not-permitted", and "network apparatus side IPv4 address of the network apparatus server".

The "IP address" indicates an IP address of the secure communication bridge 30. The "connection permitted/not-permitted" indicates whether connection is permitted for the access to the IP address. The "control connection permitted/not-permitted" indicates whether connection for control is permitted. The "network apparatus side IPv4 address of the network apparatus server" indicates an IPv4 address of the secure communication bridge 30 as the network apparatus server.

FIG. 33 shows information stored in the IPSec setting storing unit 32. As shown in FIG. 33, the IPSec setting storing unit 32 stores setting information (security policy) for each network apparatus that is an object for IPSec acceleration.

Next, each processing is described using each flowchart.

Figure 34:
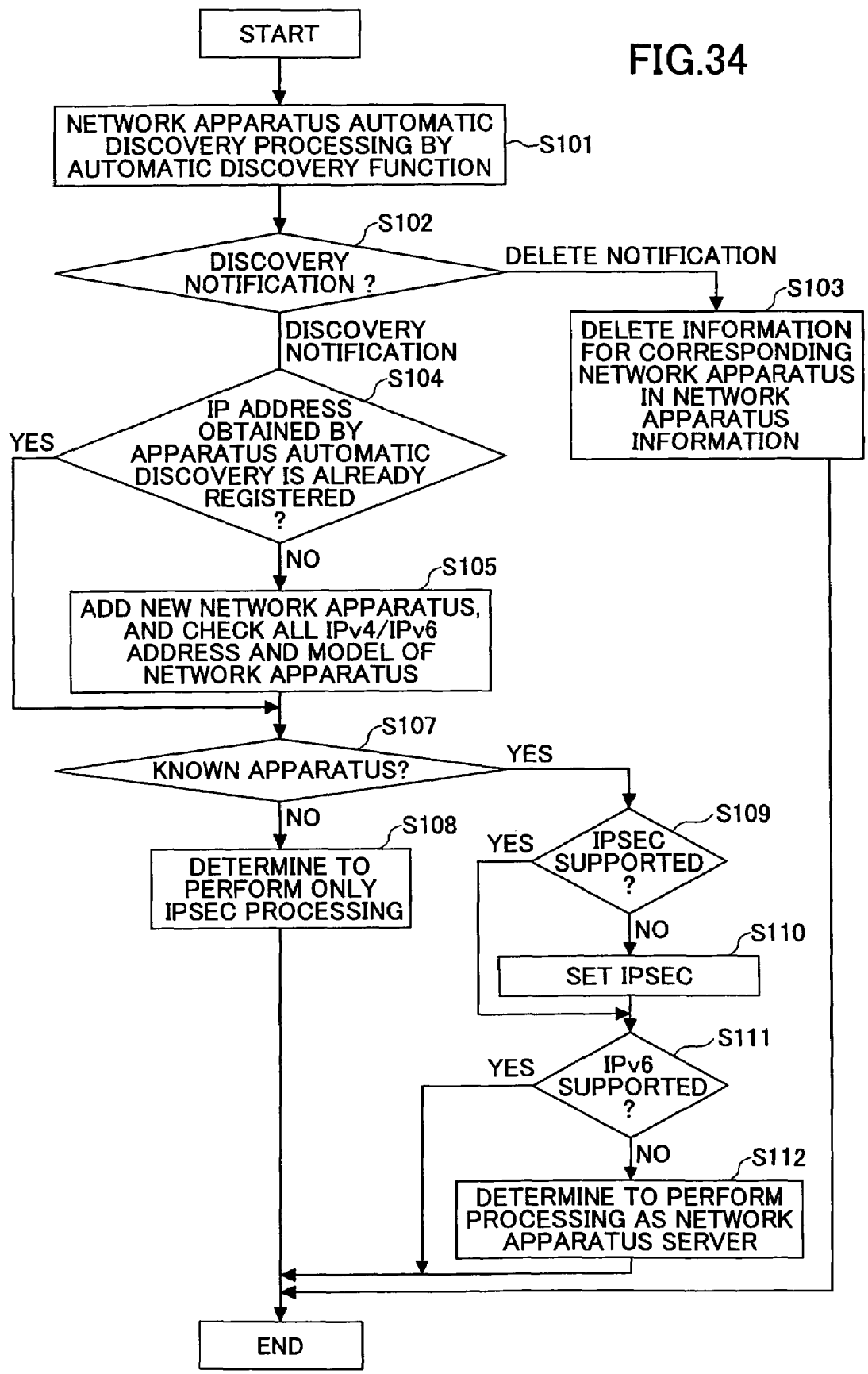
FIG. 34 is a flowchart showing processing on network apparatus automatic discovery.

FIG. 34 is a flowchart showing processing on network apparatus automatic discovery. In step S101, automatic discovery processing for an internal network apparatus is performed by the automatic discovery function for a network apparatus. A known automatic discovery processing can be used as the automatic discovery processing.

Next, the secure communication bridge 30 determines whether notification of the automatic discovery function unit 36 is discovery notification or delete notification in step S102. When it is delete notification, information on a corresponding network apparatus is deleted from the network apparatus information storing unit 38 in step S103. In this embodiment, a known automatic discovery function that outputs discovery notification and delete notification is used.

When detecting the discovery notification, it is determined whether the IP address obtained by automatic discovery is already registered in the network apparatus information storing unit 38 in step S104. If it is already registered, the step goes to step S107. If it is not already registered, the new IP address of the network apparatus is added to the network apparatus information storing unit 38 in step S105. In addition, all IPv4/IPv6 addresses that are set in the network apparatus, and the model of the network apparatus are checked using SNMP.

Next, by referring to the known apparatus information, it is determined whether the discovered network apparatus is a known model in step S107. When it is not a known model, it is determined that only IPSec processing is performed for the network apparatus so that IPSec setting information is stored in the IPSec setting storing unit 32. When the network apparatus is a known model in step S107, the known apparatus information is referred to. When IPSec communication is not supported by the network apparatus, the security communication bridge 30 determines to perform IPSec communication for the network apparatus (No in steo S109), so that setting for the IPSec setting storing unit 32 is set in step S110. For the setting, methods described so far can be used. In step S111, it is determined whether the network apparatus supports IPv6. If IPv6 is not supported by the network apparatus (No in step S111), the security communication bridge 30 determines to perform processing as a network apparatus server, and stores information for the processing in a storage associating with the network apparatus in step S112. If the IPv6 is supported by the network apparatus, only IPSec processing is performed.

Figure 35:
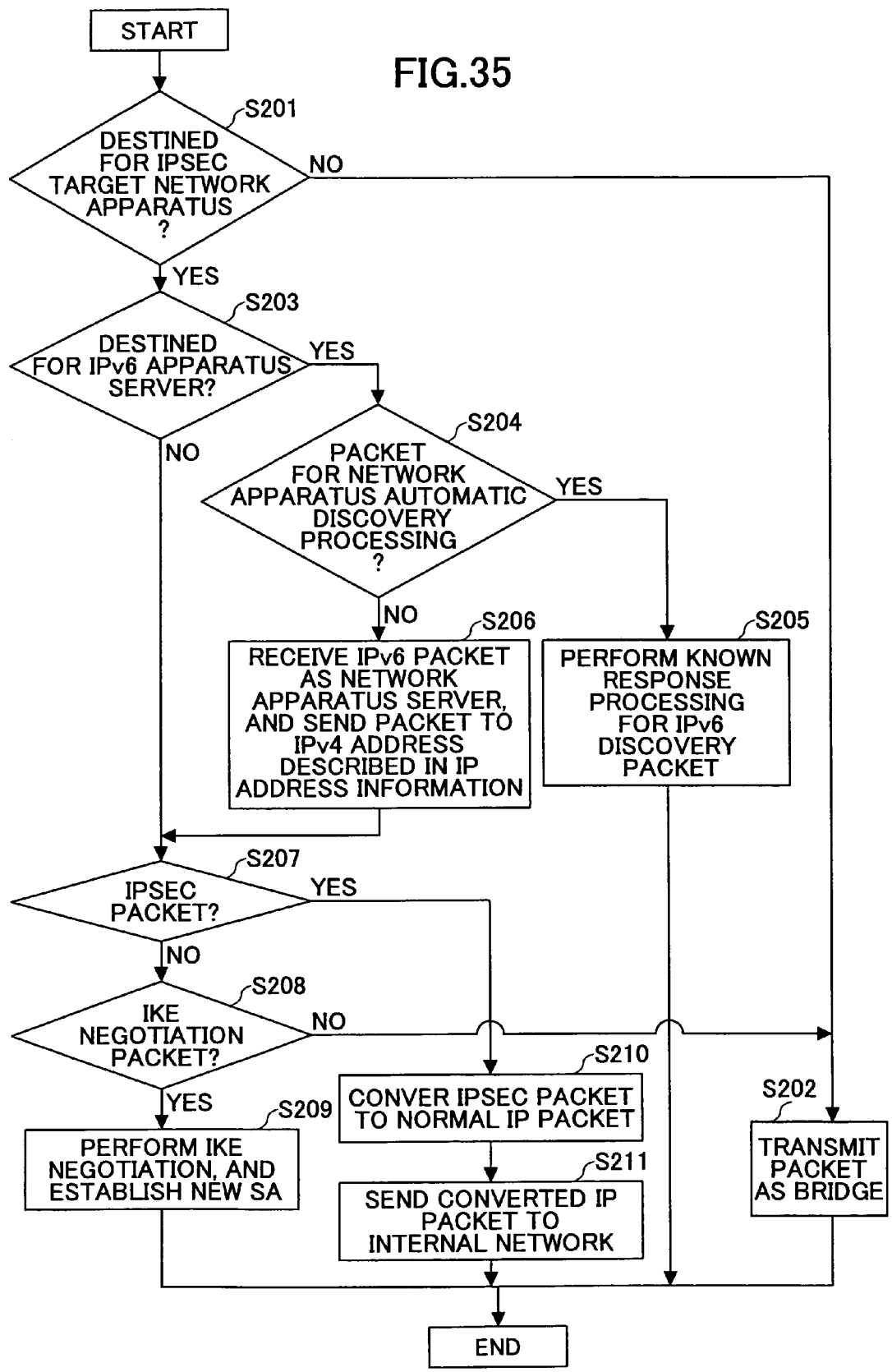
FIG. 35 is a flowchart showing processing when a packet arrives from the external network.

Next, processing when a packet arrives from the external network is described with reference to a flowchart of FIG. 35. In step S201, the secure communication bridge 30 determines whether the arriving packet is a packet destined for the network apparatus that is an object for IPSec acceleration by referring to the IPSec setting storing unit 32. If the arriving packet is not the packet destined for the object network apparatus, the secure communication bridge 30 transmits the packet as a normal bridge in step S202.

If the arriving packet is the packet destined for the object network apparatus, the secure communication bridge 30 determines whether the packet is destined for the secure communication bridge 30 as an IPv6 network apparatus server in step S203. When the packet is destined for the secure communication bridge 30 as an IPv6 network apparatus server, the secure communication bridge 30 determines whether the packet is a packet for network apparatus automatic discovery processing. When the packet is a packet for network apparatus automatic discovery processing, responding processing for the network apparatus discovery packet is performed in step S205.

When the packet is not a packet for network apparatus automatic discovery processing in step S204, the secure communication bridge 30 receives the IPv6 packet as the network apparatus server, and sends the packet to an IPv4 address described in the IP address information storing unit 39.

When it is determined that the packet is not destined for the secure communication bridge 30 in step S203, it is determined whether the packet is an IPSec packet in step S207. When the packet is an IPSec packet, the IPSec packet is converted to a normal IP packet according to corresponding SA in step S210. When there is no corresponding SA, the packet is not converted. Then, in step S211, the packet converted from the IPSec packet is sent to the internal network.

When it is determined that the packet is not an IPSec packet in step S207, it is determined whether the packet is an IKE negotiation packet in step S208. When the packet is not an IKE negotiation packet, the step goes to processing of step S202.

When the packet is an IKE negotiation packet, IKE negotiation processing and establishment of SA corresponding to the negotiation are performed in step S209.

Figure 36:
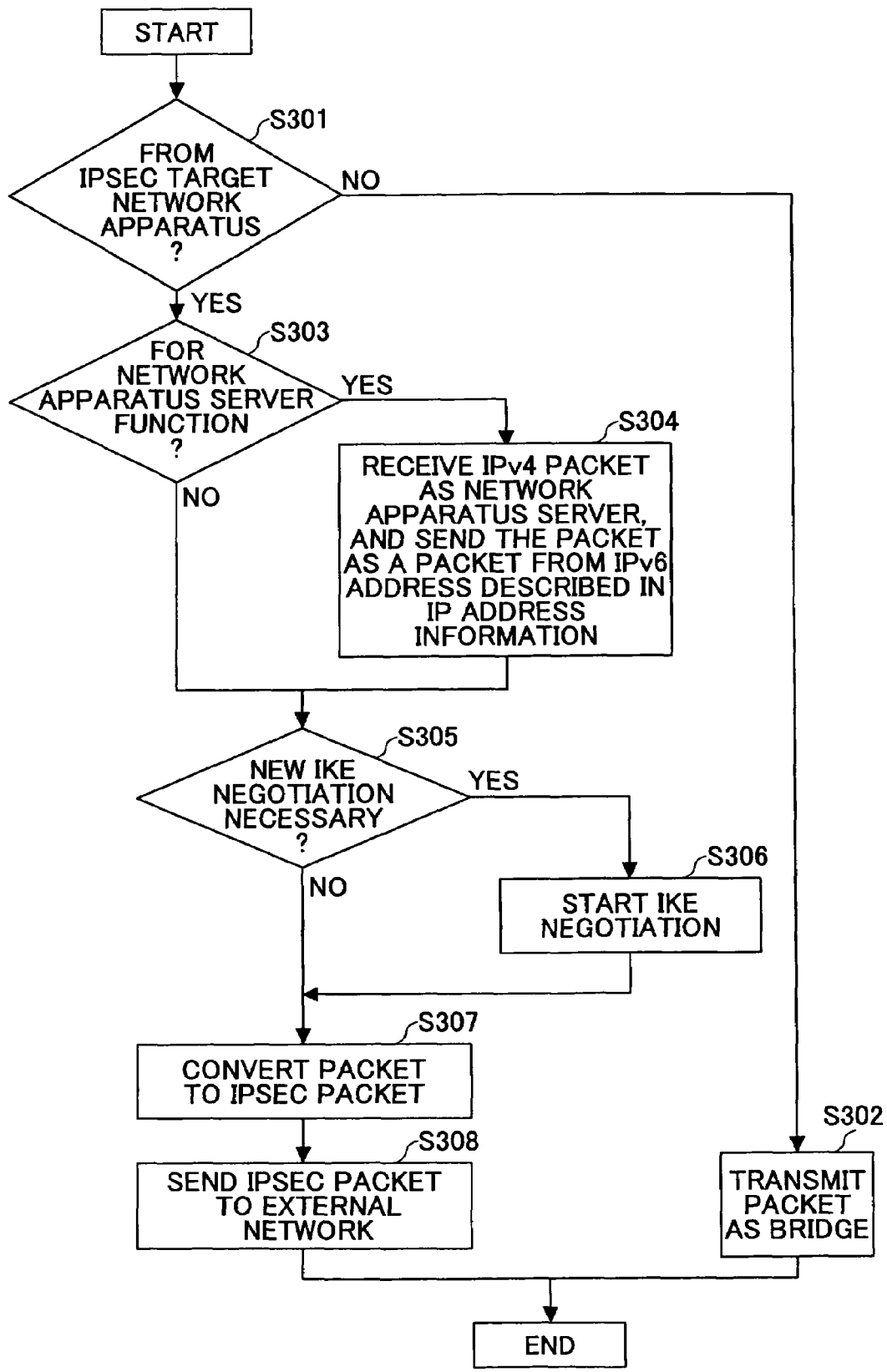
FIG. 36 is a flowchart showing processing when a packet arrives from the internal network.

Next, processing when a packet arrives from the internal network is described with reference to a flowchart of FIG. 36.

In step S301, it is determined whether the arriving packet is a packet from a network apparatus that is an object for IPSec acceleration. When the arriving packet is not a packet from the object network apparatus, the secure communication bridge 30 transmits the packet as a normal bridge in step S302.

When the arriving packet is a packet from the object network apparatus, the secure communication bridge 30 determines whether the packet is destined for the secure communication bridge 30 as a network apparatus server. When the packet is destined for the secure communication bridge 30 as a network apparatus server, the packet arrives as an IPv4 packet is sent as a packet having an IPv6 address described in the IP address information storing unit 39 in step S304.

In step S305, it is determined whether new IKE negotiation processing is necessary. When the new IKE negotiation processing is necessary, processing for the IKE negotiation starts in step S306.

Next, in step S307, the packet is converted into an IPSec packet according to corresponding SA. When there is no corresponding SA, the packet is not converted. Then, the IPSec packet is sent to the external network in step S308.

In the above-mentioned processing, a known network discovery function, for example, can be used. In processing described in the following, DHCP is used as means for automatically discovering the network apparatus like the second embodiment.

Figure 37:
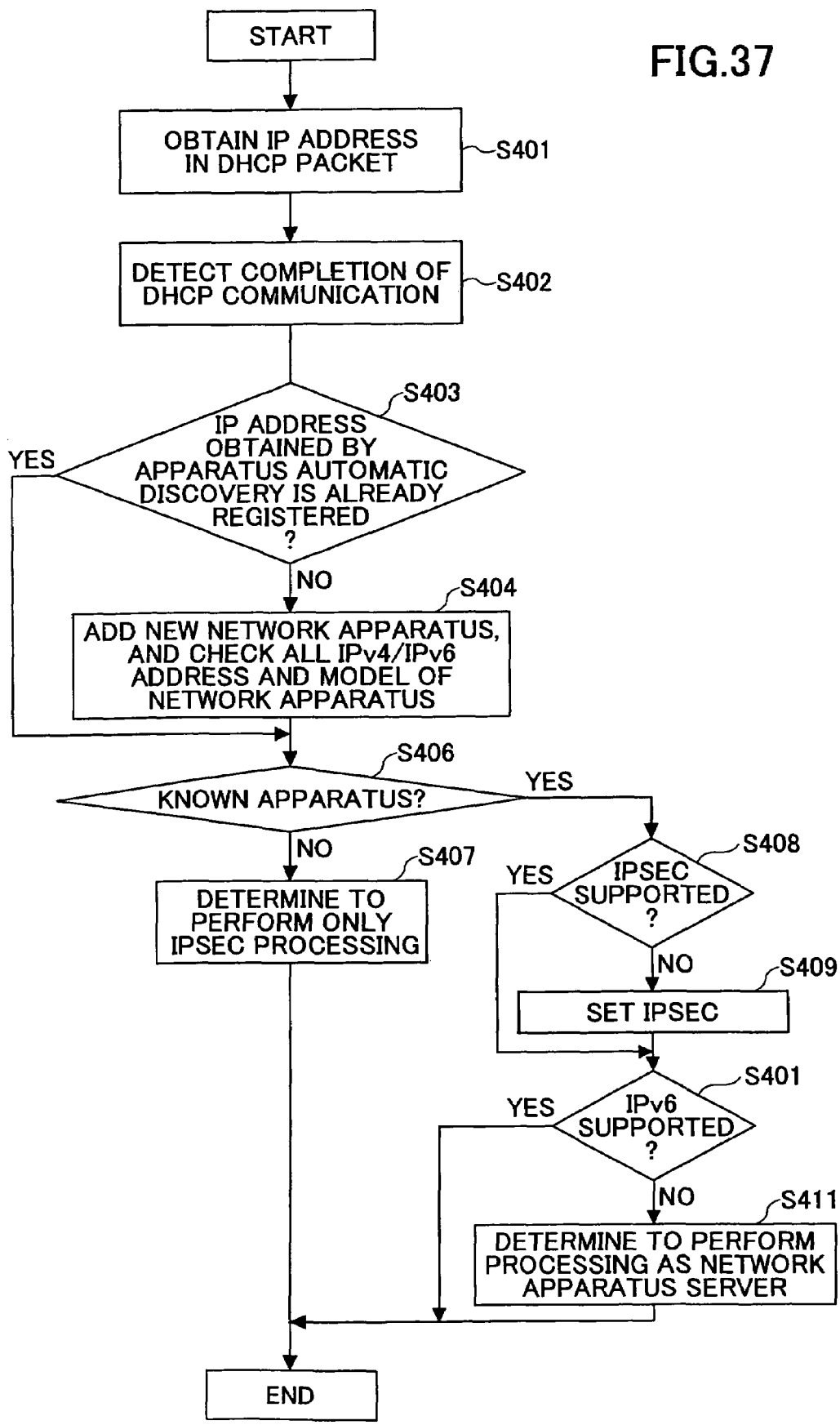
FIG. 37 is a flowchart showing automatic discovery processing using DHCP.

Processing in this embodiment is described with reference to a flowchart shown in FIG. 37. A monitored DHCP packet is a DHCP packet that is transmitted from the external network to the internal network.

The secure communication bridge 30 obtains the IP address in the passed DHCP packet in step S401. Next, in step S402, the secure communication bridge 30 detects completion of DHCP communication. In step S403, the secure communication bridge 30 determines whether the obtained IP address is already registered. If it is already registered, the step goes to step S406. If it is not already registered, the new IP address of the network apparatus is added to the network apparatus information in step S404. In addition, all IPv4/IPv6 addresses that are set in the network apparatus, and the model of the network apparatus are checked using SNMP.

Next, by referring to the known apparatus information, it is determined that the discovered network apparatus is a known model in step S406. When it is not a known model, it is determined that only IPSec processing is performed for the network apparatus so that IPSec setting information is stored in the IPSec setting storing unit 32 in step 407. When the network apparatus is a known model, the known apparatus information is referred to. When IPSec communication is not supported by the network apparatus (No in step S408), the security communication bridge 30 determines to perform IPSec communication for the network apparatus, so that setting for the IPSec setting storing unit 32 is set in step S409. For the setting, methods described so far can be used. In step S410, it is determined whether the network apparatus supports IPv6. If IPv6 is not supported by the network apparatus (No in step S410), the security communication bridge 30 determines to perform processing as a network apparatus server, and stores information for the processing in a storage associating with the network apparatus in step S411.

Figure 38:
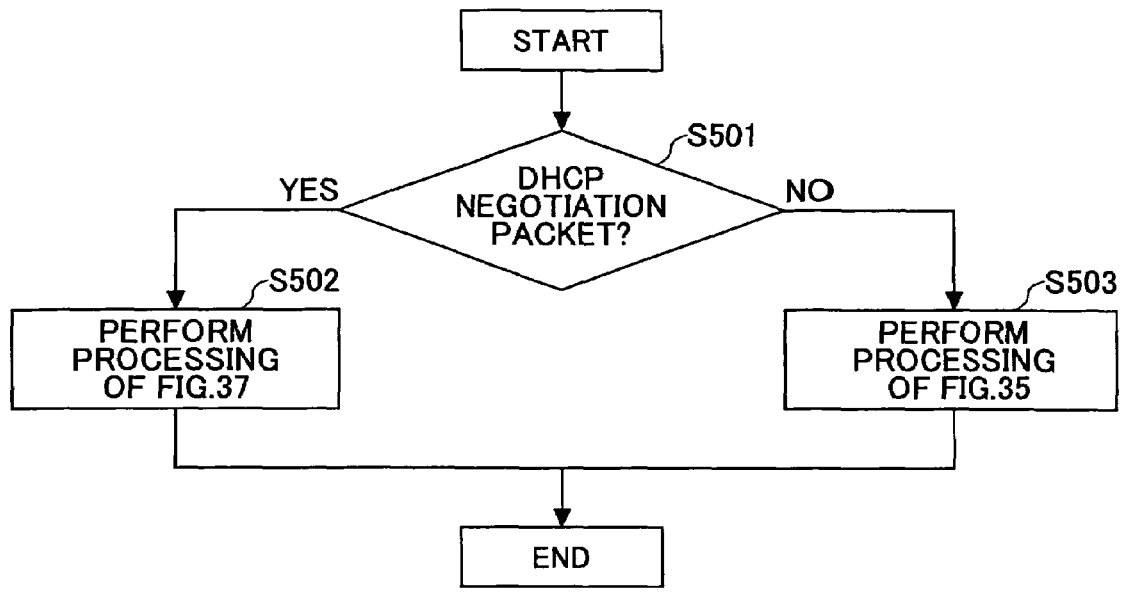
FIG. 38 is a flowchart showing processing when a packet arrives from the external network.

In the case for monitoring the DHCP packet, processing when a packet arrives from the external network is described with reference to a flowchart of FIG. 38.

In step S501, it is determined whether the packet is a DHCP negotiation packet. When the packet is the DHCP negotiation packet, processing described in FIG. 37 is performed in step S502. When the packet is not the DHCP negotiation packet, processing described in FIG. 35 is performed in step S503.

Figure 39:
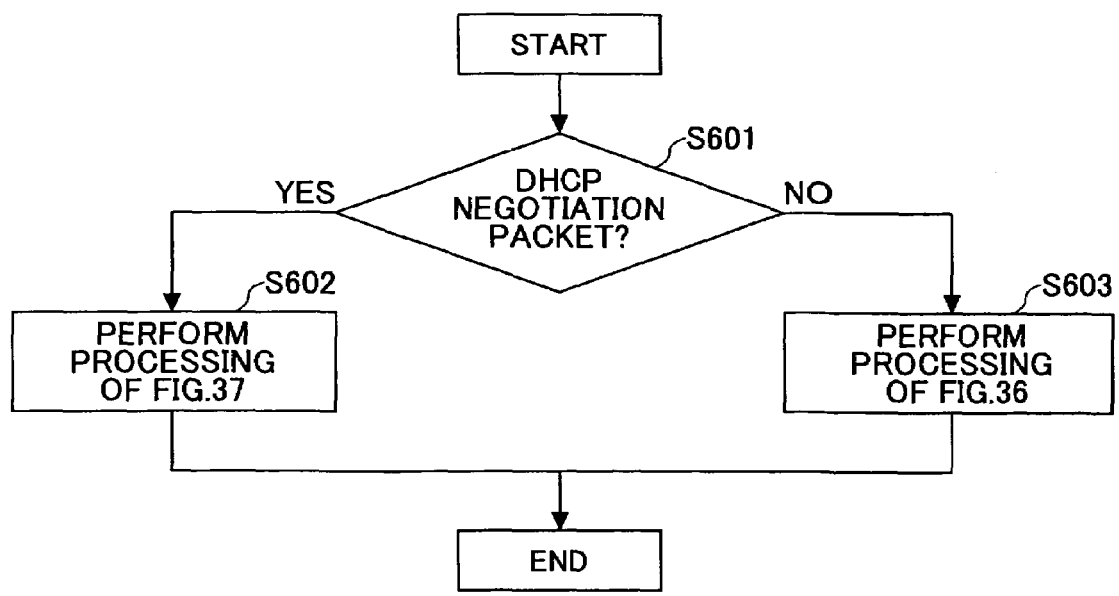
FIG. 39 is a flowchart showing processing when a packet arrives from the internal network.

Similarly, in the case for monitoring the DHCP packet, processing when a packet arrives from the internal network is described with reference to a flowchart of FIG. 39.

In step S601, it is determined whether the packet is a DHCP negotiation packet. When the packet is the DHCP negotiation packet, processing described in FIG. 37 is performed in step S602. When the packet is not the DHCP negotiation packet, processing described in FIG. 36 is performed in step S503. In this case, in step S602, monitoring of a packet sent from the external network to the internal network is performed. Then, the processing of FIG. 37 is performed.

Figure 40:
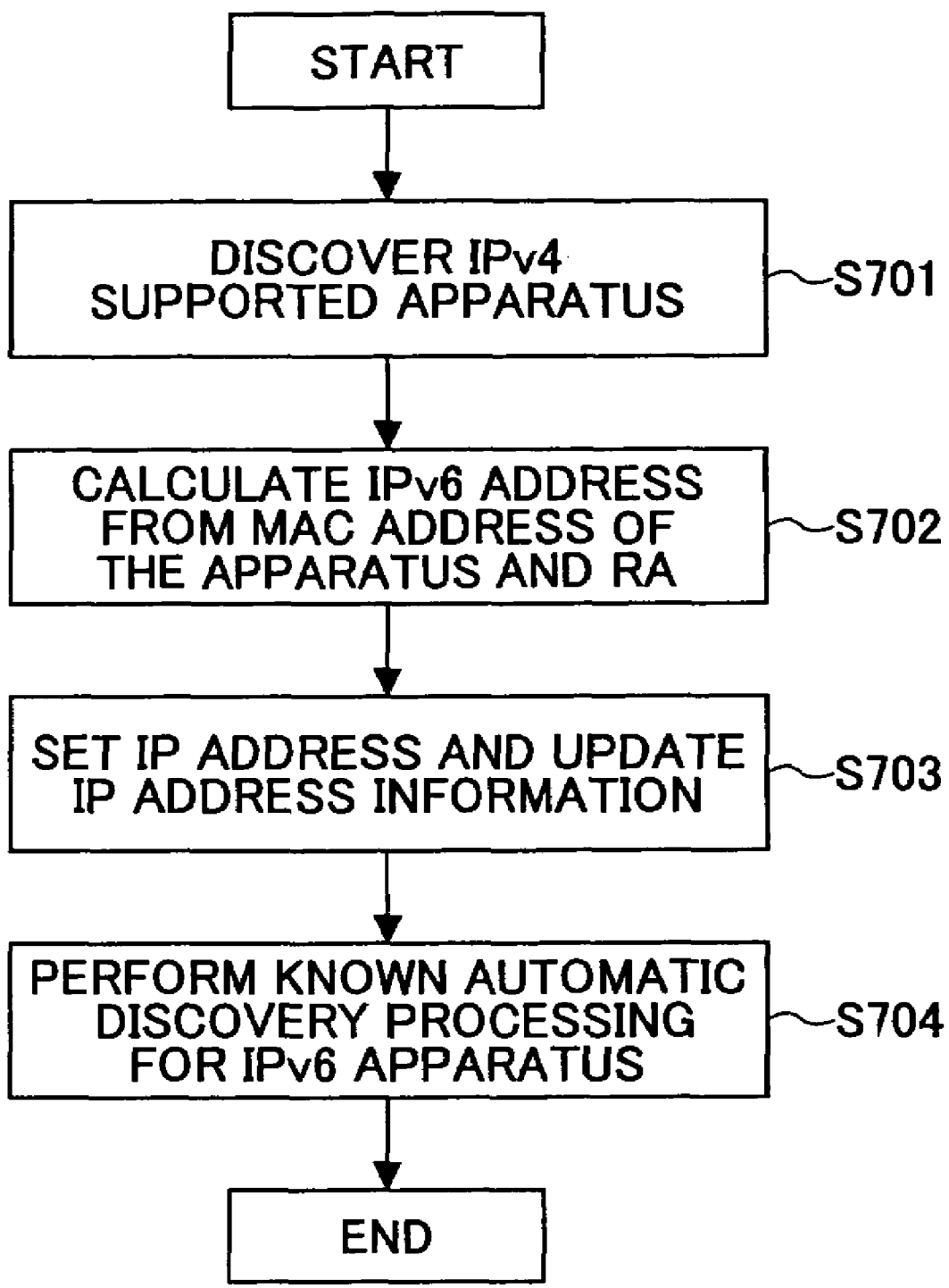
FIG. 40 is a flowchart showing processing for providing IPv6 function to the network apparatus in a pseudo manner.

Next, in a case when IPv6 is not supported in the object network apparatus, processing for providing not only IPSec function but also IPv6 function to the network apparatus in a pseudo manner is described with reference to FIG. 40. In step S701, an IPv4 supported network apparatus is found. At this time, the secure communication bridge 30 knows that only IPv4 is supported by the network apparatus based on the known apparatus information.

In step S702, the secure communication bridge 30 calculates an IPv6 address from the MAC address of the network apparatus and RA. Then, in step S703, the secure communication bridge 30 sets the IP address to the secure communication bridge 30 and updates information in the IP address information storing unit 39.

In step S704, the secure communication bridge 30 performs known processing for automatically discovering an IPv6 network apparatus in order to show the set IP address as an IP address of the network apparatus from the viewpoint of the external network.

According to the above-mentioned embodiments, the network apparatus can automatically perform secure communication. In addition, the secure communication bridge 30 can obtain detailed information of the network apparatus so that the secure communication bridge 30 can automatically make secure communication setting for the network apparatus.

In addition, by using the DHCP communication function that exists from the past, the network apparatus can be found and the IP address can be obtained so that secure communication setting can be automatically performed. Accordingly, even if the network apparatus does not have a mechanism for reporting existence of the network apparatus itself, the network apparatus can be discovered.

In addition, a network apparatus that supports only IPv4 can be made to support IPv6. In addition, since the secure communication bridge originally includes a secure communication supporting function, supporting for secure communication can be realized at a low cost when performing support of IPv6.

The present invention is not limited to the specifically disclosed embodiments, and variations and modifications may be made without departing from the scope of the present invention.

The present application contains subject matter related to Japanese patent application No. 2004-369794, filed in the JPO on Dec. 21, 2004, and Japanese patent application No. 2005-362675, filed in the JPO on Dec. 16, 2005 the entire contents of which are incorporated herein by reference.

What is claimed is:

1. A communication apparatus that is connected to an information processing apparatus, comprising:
    an information processing apparatus discovery unit configured to discover the information processing apparatus;
    a secure communication packet conversion unit configured to convert a received non-secure communication packet transmitted by the discovered information processing apparatus into a converted secure communication packet;
    a non-secure communication packet conversion unit configured to convert a received secure communication packet destined for the information processing apparatus into a converted non-secure communication packet;
    an information obtaining unit configured to obtain information processing apparatus information on the information processing apparatus from the discovered information processing apparatus;
    an information processing apparatus information storing device configured to store information processing apparatus information of known information processing apparatuses, the information processing apparatus information including secure communications capability information indicating presence or absence of secure communications capability; and
    a unit configured to determine whether to perform conversion processing of the secure communication packet for the discovered information processing apparatus based on the information processing apparatus information obtained by the information obtaining unit and information processing apparatus information stored in the information processing apparatus information storing device.

2. The communication apparatus as claimed in claim 1, the communication apparatus comprising:
  a setting information storing unit configured to store secure communication setting information for each known information processing apparatus; and
  a unit configured to obtain secure communication setting information corresponding to the discovered information processing apparatus from the setting information storing unit, and to make a setting for secure communication for the discovered information processing apparatus using the obtained secure communication setting information.

3. The communication apparatus as claimed in claim 2, the communication apparatus comprising a unit configured to update the information processing apparatus information stored in the information processing apparatus information storing device and the secure communication setting information stored in the setting information storing unit based on a request from an external apparatus.

4. The communication apparatus as claimed in claim 1, wherein the information processing apparatus discovery unit obtains an IP address of the information processing apparatus by monitoring communication for setting the IP address for the information processing apparatus.

5. The communication apparatus as claimed in claim 4, wherein the communication for setting the IP address is communication of DHCP.

6. The communication apparatus as claimed in claim 1, the communication apparatus comprising:
  an IPv6 address setting unit configured to set an IPv6 address to the communication apparatus when the information processing apparatus does not support IPv6;
  a pseudo IPv4 packet transmission unit configured to convert a destination address of a packet destined for the IPv6 address into an IPv4 address of the information processing apparatus and transmit the converted packet to the information processing apparatus; and
  a pseudo IPv6 packet transmission unit configured to convert a source address of a packet transmitted by the information processing apparatus into the IPv6 address and transmit the converted packet.

7. A communication method in a communication apparatus that is connected to an information processing apparatus, comprising:
  an information processing apparatus discovery step of discovering the information processing apparatus;
  a secure communication packet conversion step of converting a non-secure communication packet transmitted by the discovered information processing apparatus into a secure communication packet;
  a non-secure communication packet conversion step of converting the secure communication packet destined for the information processing apparatus into the non-secure communication packet;
  an information obtaining step of obtaining information processing apparatus information on the information processing apparatus from the discovered information processing apparatus;
  an information storing step of storing information processing apparatus information of known information processing apparatuses in an information storing unit, the information processing apparatus information including secure communications capability information indicating presence or absence of secure communications capability; and
  a step of determining whether to perform conversion processing of the secure communication packet for the discovered information processing apparatus based on the information processing apparatus information obtained in the information obtaining step and information processing apparatus information stored in the information storing unit.

8. The communication method as claimed in claim 7, further comprising a setting information storing step of storing secure communication setting information for each known information processing apparatus in a setting information storing unit, and
  a step of obtaining secure communication setting information corresponding to the discovered information processing apparatus from the setting information storing unit, and making setting for secure communication for the discovered information processing apparatus using the obtained secure communication setting information.

9. The communication method as claimed in claim 8, the communication method further comprising a step of updating the information processing apparatus information stored in the information processing apparatus information storing unit and the secure communication setting information stored in the setting information storing unit based on a request from an external apparatus.

10. The communication method as claimed in claim 7, wherein, in the information processing apparatus discovery step, the communication apparatus obtains an IP address of the information processing apparatus by monitoring communication for setting the IP address for the information processing apparatus.

11. The communication method as claimed in claim 10, wherein the communication for setting the IP address is communication of DHCP.

12. The communication method as claimed in claim 7, the communication method comprising:
  an IPv6 address setting step of setting an IPv6 address to the communication apparatus when the information processing apparatus does not support IPv6;
  a pseudo IPv4 packet transmission step of converting a destination address of a packet destined for the IPv6 address into an IPv4 address of the information processing apparatus and transmitting the converted packet to the information processing apparatus; and
  a pseudo IPv6 packet transmission step of converting a source address of a packet transmitted by the information processing apparatus into the IPv6 address and transmitting the converted packet.

13. A non-transitory computer readable recording medium storing a program for causing a communication apparatus that is connected to an information processing apparatus to provide secure communication to the information processing apparatus, the program comprising:
  an information processing apparatus discovery program code unit configured to discover the information processing apparatus;
  a secure communication packet conversion program code unit configured to convert a non-secure communication packet transmitted by the discovered information processing apparatus into a secure communication packet; and
  a non-secure communication packet conversion program code unit configured to convert the secure communication packet destined for the information processing apparatus into the non-secure communication packet;
  an information obtaining program code unit configured to obtain information processing apparatus information on the information processing apparatus from the discovered information processing apparatus;

an information storing program code unit configured to store information processing apparatus information of known information processing apparatuses in an information storing unit, the information processing apparatus information including secure communications capability information indicating presence or absence of secure communications capability; and a program code unit configured to determine whether to perform conversion processing of the secure communication packet for the discovered information processing apparatus based on the information processing apparatus information obtained by the information obtaining program code unit and information processing apparatus information stored in the information storing unit.

14. The communication apparatus as claimed in claim 1, wherein
said secure communication packet conversion unit is configured to convert said non-secure communication packet into said secure communication packet by at least encrypting said non-secure communication packet.

* * * * *